(12) United States Patent
Katagiri et al.

(10) Patent No.: US 10,094,958 B2
(45) Date of Patent: Oct. 9, 2018

(54) LIGHT DIFFUSION FILM

(71) Applicant: LINTEC Corporation, Itabashi-Ku, Tokyo (JP)

(72) Inventors: Baku Katagiri, Tokyo (JP); Kentaro Kusama, Tokyo (JP); Tomoo Orui, Tokyo (JP)

(73) Assignee: LINTEC Corporation, Tokyo (JP)

( * ) Notice: Subject to any disclaimer, the term of this patent is extended or adjusted under 35 U.S.C. 154(b) by 41 days.

(21) Appl. No.: 14/655,696

(22) PCT Filed: Dec. 2, 2013

(86) PCT No.: PCT/JP2013/082323
§ 371 (c)(1),
(2) Date: Jun. 25, 2015

(87) PCT Pub. No.: WO2014/103618
PCT Pub. Date: Jul. 3, 2014

(65) Prior Publication Data
US 2015/0355390 A1 Dec. 10, 2015

(30) Foreign Application Priority Data

Dec. 27, 2012 (JP) .................................. 2012-284683

(51) Int. Cl.
*G02B 5/02* (2006.01)
*G02B 27/09* (2006.01)
*G02F 1/1335* (2006.01)

(52) U.S. Cl.
CPC ............. *G02B 5/0242* (2013.01); *G02B 5/02* (2013.01); *G02B 5/0278* (2013.01);
(Continued)

(58) Field of Classification Search
CPC ........ G02B 3/08; G02B 5/0278; G02B 5/045; G02B 5/02571; G02B 5/02; G02B 5/0242;
(Continued)

(56) References Cited

U.S. PATENT DOCUMENTS 6,398,370 B1 * 6/2002 Chiu .................. G03B 21/2026
353/102

FOREIGN PATENT DOCUMENTS

JP        63-309902 A      12/1988
JP        2005-292219 A    10/2005
(Continued)

*Primary Examiner* — Jie Lei
(74) *Attorney, Agent, or Firm* — Renner, Kenner; Arthur M. Reginelli

(57) ABSTRACT

According to the present invention, there is provided a light diffusion film for diffusing incident light into an elliptical shape, which contains, inside the film, a structure composed of a plurality of flaky-shaped objects with comparatively high refractive index arranged in multiple rows in a region with comparatively low refractive index along any one arbitrary direction along the film plane. If $T_{50}$ (μm) is the width of the flaky-shaped objects at a position of 50 μm below the upper end of the flaky-shaped objects in the direction of the thickness of the light diffusion film, and if $L_{50}$ (μm) is the length of the flaky-shaped objects in the above-mentioned arbitrary one direction, the following relation (1) is satisfied:

$0.05 \leq T_{50}/L_{50} < 0.9$      (1)

9 Claims, 25 Drawing Sheets

(52) U.S. Cl.
CPC ....... *G02B 27/095* (2013.01); *G02B 27/0988* (2013.01); *G02F 1/133504* (2013.01)

(58) Field of Classification Search
CPC ................ G02B 5/0236; G02B 5/3083; G02B 27/0018; G02B 27/26; G02B 27/283; G02B 27/095; G02B 27/0988; G02F 1/1335; G02F 1/133504; G02F 1/133711; C09K 19/42; B32B 3/30
USPC ...... 359/465, 489.11, 489.19, 599, 613, 614, 359/601, 742; 428/1.1, 1.2, 131, 167, 428/168, 172, 201, 206, 207, 163, 913
See application file for complete search history.

(56) References Cited

FOREIGN PATENT DOCUMENTS

| | | |
|---|---|---|
| JP | 2009-173018 A | 8/2009 |
| JP | 4317006 B2 | 8/2009 |
| JP | 2010-86770 A | 4/2010 |
| JP | 2012-141592 A | 7/2012 |
| JP | 2012-141593 A | 7/2012 |
| WO | 2005057254 A2 | 6/2005 |
| WO | 2010-084647 A1 | 7/2010 |

\* cited by examiner

PRIOR ART

PRIOR ART

PRIOR ART

PRIOR ART

Light diffusion incident angle region

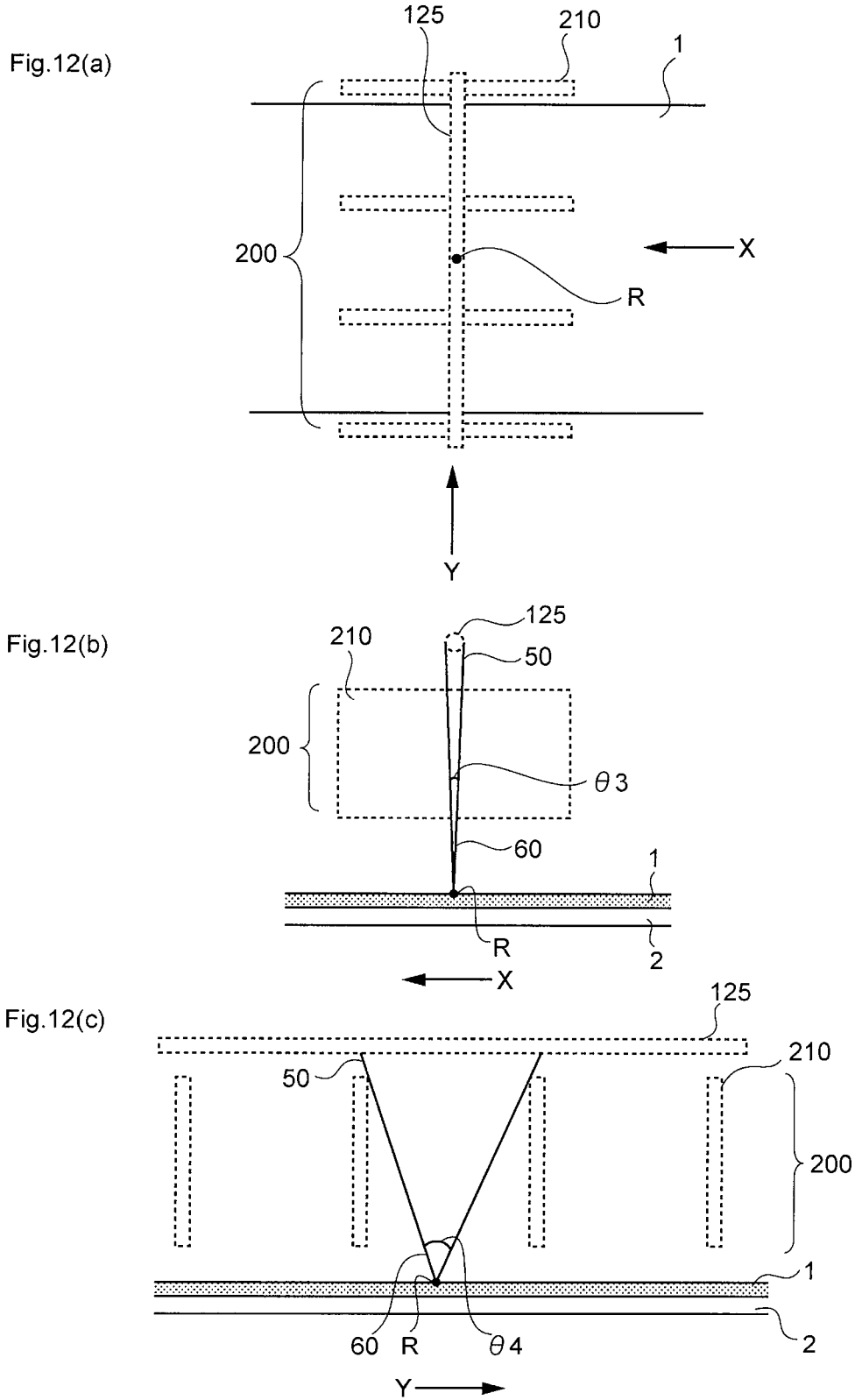

Surface ← → Bottom surface

Moving direction of the coating layer

Fig.20(a)  Surface ← → Bottom surface
Fig.20(b)
Fig.20(c)
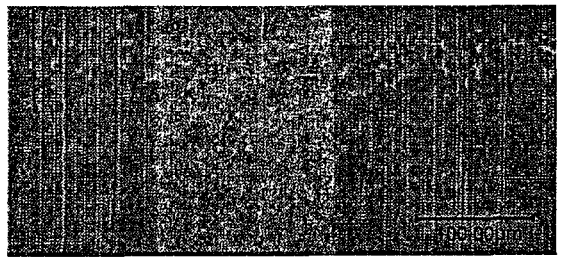

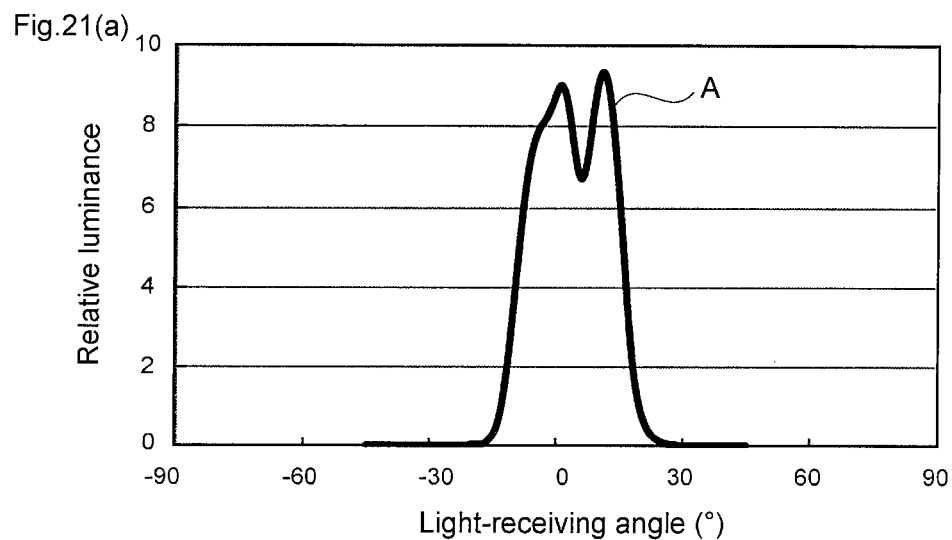
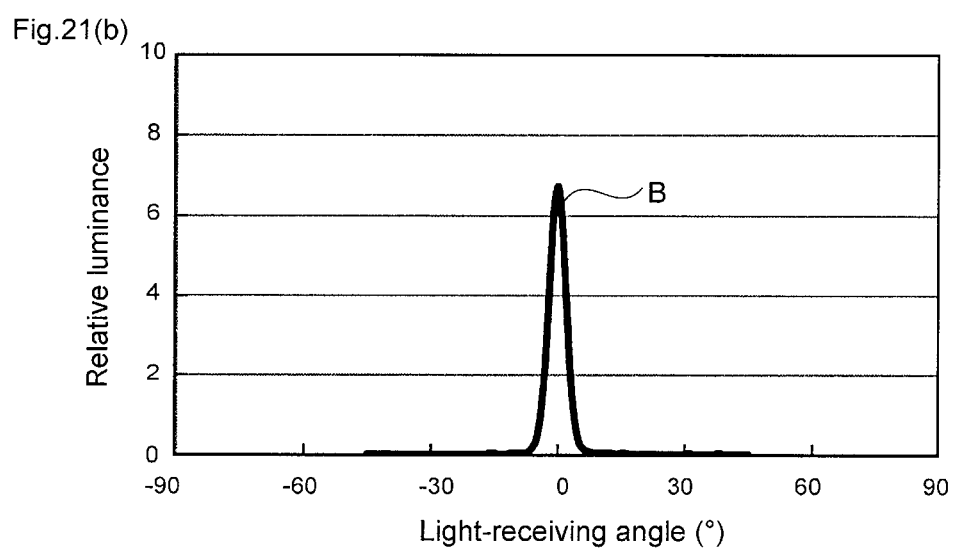

Moving direction of the coating layer

Surface ← → Bottom surface

Moving direction of the coating layer

LIGHT DIFFUSION FILM

TECHNICAL FIELD

The present invention relates to a light diffusion film.

In particular, the present invention relates to a light diffusion film which can diffuse incident light into an elliptical shape with respect to a plane parallel to the light diffusion film, and which has excellent applicability to rectangular displays.

BACKGROUND ART

Conventionally, for example, in the optical technical field to which liquid crystal display devices and the like belong, there has been suggested to use a light diffusion film for which an incident light coming from a specific direction is diffused in specific directions while an incident light coming from other directions can be directly transmitted.

Different aspects of such a diffusion film are known but, in particular, a light diffusion film is widely known which includes, inside the film, a louver structure in which a plurality of plate-shaped regions with different refractive indices are alternately arranged along any one arbitrary direction along the film plane (for example, see Patent document 1).

Namely, Patent Document 1 discloses a method for producing a light control plate (light diffusion film) which includes a first step of retaining on a film a resin composition composed of a plurality of compounds, each having one or more polymerizable carbon-carbon double bonds in their molecules and having a refractive index that is different from the refractive indices of the other compounds, irradiating the composition with ultraviolet radiation from a specific direction and thereby curing the resin composition; and a second step of retaining the resin composition on the film of the cured product thus obtained, irradiating with ultraviolet radiation from a direction different from that of the first step, and thereby curing the resin composition, characterized in that the second step is repeated if necessary.

On the other hand, another type of light diffusion film is widely known which comprises, inside the film, a columnar structure composed of a plurality of pillars with comparatively high refractive index standing close together in regions with comparatively low refractive index (see, for example Patent Documents 2 and 3).

Namely, Patent Document 2 discloses a manufacturing device by which a light control plate (light diffusion film) is formed by opposing a linear light source to a photocurable resin composition film, and, while either the photocurable resin composition film or the linear light source, or both are being moved, by irradiating the photocurable resin composition film with light from the linear light source, thereby curing the composition. The device for manufacturing a light control plate (light diffusion film) is a device in which the axial direction of the linear light source crosses the moving direction, and in which a plurality of light blocking thin plates opposed to one another are provided between the photocurable resin and the linear light source at a predetermined interval in a direction almost perpendicular to the moving direction, in such a fashion that one edge facing the photocurable resin composition of each of the light blocking thin plates is parallel to the moving direction.

In addition, Patent Document 3 discloses a method for producing a light diffusion film in which a composition containing a photocurable compound is provided into a sheet, this sheet is irradiated with parallel radiations from a predetermined direction P, thereby curing the composition and forming aggregate bodies with multiple rod-shaped curable regions which are, inside the sheet, extended parallel to the P direction, the method being characterized in that, between the linear light source and the sheet, aggregates of tubular materials aligned parallel to the P direction are intercalated, and light is irradiated through the tubular materials.

PRIOR ART REFERENCES

Patent Documents

Patent document 1: JP 63-309902 A
Patent document 2: JP 2009-173018 A
Patent document 3: JP 2005-292219 A

DISCLOSURE OF THE INVENTION

Problems to be Solved by the Invention

However, in the light diffusion film which includes a louver structure obtained with the method described in Patent Document 1, there was a problem that, among the components contained in the incident light, although there could be sufficient diffusion of the component perpendicular to the orientation of the louver structure extending in any one direction along the film plane, sufficient diffusion of the component parallel to the louver structure became difficult.

As a result, in the shape of the diffused light, there was a problem that, even though the major axis was sufficiently long, since the minor axis became significantly small, applicability to widely and commonly used rectangular displays became difficult.

On the other hand, in the light diffusion film containing a columnar structure obtained by the production methods described in Patent Documents 2 or 3, unlike the case described in Patent Document 1, there was the problem that, although the incident light could be uniformly diffused, applicability to widely and commonly used rectangular displays with different viewing angles required in the horizontal and vertical directions became difficult because of the circular shape of the diffused light.

Thus, in view of such circumstances, the inventors of the present invention conducted a thorough study, and they found that, by forming a predetermined internal structure provided with a plurality of flaky-shaped objects inside the film, it is possible to obtain a light diffusion film which can diffuse incident light into an elliptical shape with respect to a plane parallel to the light diffusion film. Thus, the inventors completed the present invention.

That is, an object of the present invention is to provide a light diffusion film which can diffuse incident light into an elliptical shape with respect to a plane parallel to the light diffusion film, and which has excellent applicability to rectangular displays.

Means for Solving the Problems

According to the present invention, there is provided a light diffusion film for diffusing incident light into an elliptical shape, which contains, inside the film, a structure composed of a plurality of flaky-shaped objects with comparatively high refractive index arranged in multiple rows in regions with comparatively low refractive index along any one arbitrary direction along the film plane. If $T_{50}$ (µm) is the width of the flaky-shaped objects at a position of 50 µm below the upper end of the flaky-shaped objects in the direction of the thickness of the light diffusion film, and if $L_{50}$ (μm) is the length of the flaky-shaped objects in the above-mentioned arbitrary one direction, the film is characterized in that the following relation (1) is satisfied and the problems described above may be solved.

$$0.05 \leq T_{50}/L_{50} < 0.9 \qquad (1)$$

That is, the light diffusion film of the present invention contains a predetermined internal structure inside the film provided with a plurality of flaky-shaped objects, different from a conventional louver structure and from a conventional columnar structure.

As a result, with such a predetermined internal structure, an incident light can be diffused into an elliptical shape with respect to a plane surface parallel to the light diffusion film and, therefore, the light diffusion film can easily be applied to rectangular displays.

Furthermore, on the occasion of configuring the diffusion film of the present invention, it is preferable to adjust $T_{50}$ to a value in the range of 0.1 to 15 μm and to adjust $L_{50}$ to a value in the range of 0.11 to 300 μm.

With such a configuration, an incident light can be diffused more effectively into an elliptical shape.

Furthermore, on the occasion of configuring the diffusion film of the present invention, it is preferable that the length L of the flaky-shaped objects in the above-mentioned arbitrary one direction be lengthened downward from the upper end side in the thickness direction of the light diffusion film.

With such a configuration, an incident light can be diffused even more effectively into an elliptical shape.

Furthermore, on the occasion of configuring the diffusion film of the present invention, if $T_{75}$ (μm) is the width of the flaky-shaped objects at a position of 75 μm below the upper end of the flaky-shaped objects in the direction of the thickness of the light diffusion film, and if $L_{75}$ (μm) is the length of the flaky-shaped objects in the above-mentioned arbitrary one direction, the following relation (2) is more preferably satisfied.

$$0.01 \leq T_{75}/L_{75} < 0.5 \qquad (2)$$

With such a configuration, an incident light can be diffused still more effectively into an elliptical shape.

Moreover, on the occasion of configuring the diffusion film of the present invention, if $T_{100}$ (μm) is the width of the flaky-shaped objects at a position of 100 μm below the upper end of the flaky-shaped objects in the direction of the thickness of the light diffusion film, and if $L_{100}$ (μm) is the length of the flaky-shaped objects in the above-mentioned arbitrary one direction, the following relation (3) is more preferably satisfied.

$$0.005 \leq T_{100}/L_{100} \leq 0.1 \qquad (3)$$

With such a configuration, the incident light may be diffused much more effectively into an elliptical shape.

Furthermore, on the occasion of configuring the diffusion film of the present invention, it is preferable to adjust the thickness of the light diffusion film to a value in the range of 100 to 500 μm.

With such a configuration, more satisfactory incident angle dependency may be obtained.

Meanwhile, "satisfactory incident angle dependency" means that the distinction between a light diffusion incident angle region and a non-diffusion incident angle region, in which an incident light is directly transmitted without being diffused, is precisely controlled.

Furthermore, on the occasion of configuring the diffusion film of the present invention, it is preferable that a composition for light diffusion film containing two polymerizable, compounds with different refractive indices be used as raw material for the light diffusion film.

With such a configuration, a predetermined internal structure can be formed in a more stable way.

Moreover, on the occasion of configuring the diffusion film of the present invention, when incident light is diffused by the light diffusion film, in the elliptical-shaped light diffusion thus obtained, if θ2(°) is the angle of aperture of the diffused light in the major axis direction, and if θ2'(°) is the angle of aperture of the diffused light in the minor axis direction, the following relation (4) is preferably satisfied:

$$0.2 \leq \theta2/\theta2' \leq 0.9 \qquad (4)$$

With such a configuration, the applicability to rectangular displays can be further improved.

BRIEF DESCRIPTION OF THE DRAWINGS

FIGS. 12 (a) to (c) are diagrams provided in order to explain the control of the incident angle width of each of the azimuth angle directions.

FIGS. 20 (a) to (c) are diagrams provided in order to explain the aspects of cross-sections in the light diffusion film of Comparative Example 1.

FIGS. 21 (a) and (b) are light-receiving-relative luminance charts illustrating the light diffusion characteristics in the light diffusion film of Comparative Example 1.

EMBODIMENTS FOR CARRYING OUT THE INVENTION

According to an embodiment of the present invention, there is provided a light diffusion film for diffusing incident light into an elliptical shape, which contains, inside the film, a structure composed of a plurality of flaky-shaped objects with comparatively high refractive index, arranged in multiple rows in a region with comparatively low refractive index along any one arbitrary direction along the film plane. If $T_{50}$ (μm) is the width of the flaky-shaped objects at a position of 50 μm below the upper end of the flaky-shaped objects in the direction of the thickness of the light diffusion film, and if $L_{50}$ (μm) is the length of the flaky-shaped objects in the above-mentioned arbitrary one direction, the light diffusion film is characterized in that the following relation (1) is satisfied.

$$0.05 \leq T_{50}/L_{50} < 0.9 \quad (1)$$

Hereinafter, the embodiment of the present invention will be explained specifically with appropriate references to the drawings, but, in order to facilitate the comprehension of such explanations, first, the fundamental principles of light diffusion in a light diffusion film will be explained.

1. Fundamental Principles of Light Diffusion in a Light Diffusion Film (1) Anisotropic Light Diffusion First of all, a light diffusion film having anisotropic light diffusion characteristics will be described using FIGS. 1 and 2.

Figure 1A:
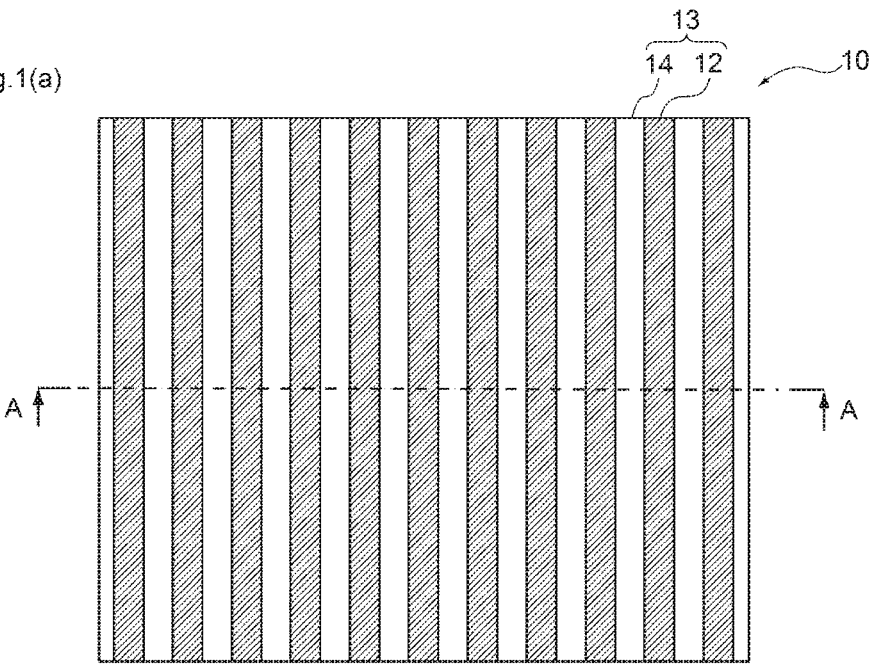
FIGS. 1 (a) and (b) are diagrams provided in order to explain the outline of a light diffusion film which includes a louver structure inside the film.
Figure 1B:
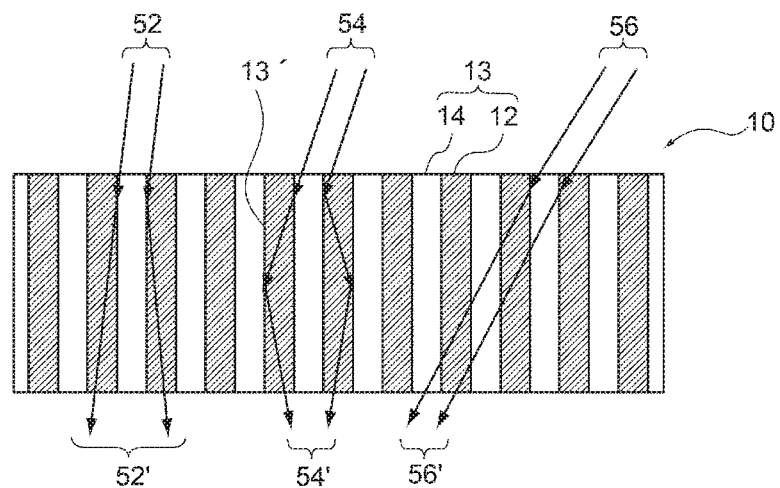

First, FIG. 1 (a) shows a top view (plan view) of an anisotropic light diffusion film 10, and FIG. 1 (b) shows a cross-sectional view of the anisotropic light diffusion film 10 in a case in which the anisotropic light diffusion film 10 is cut in a perpendicular direction along the dotted line A-A, and the cut surface is viewed from the arrow direction.

Figure 2A:
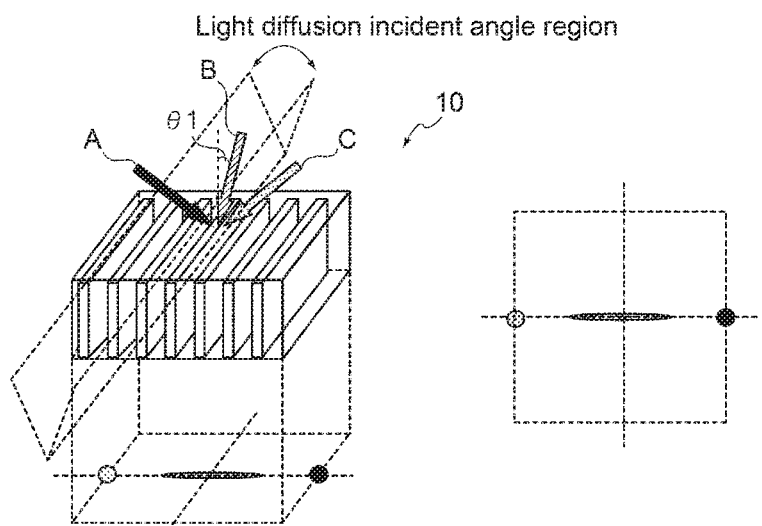
FIGS. 2 (a) and (b) are diagrams provided in order to explain the incident angle dependency and anisotropic light diffusion in a light diffusion film which includes a louver structure inside the film.
Figure 2B:
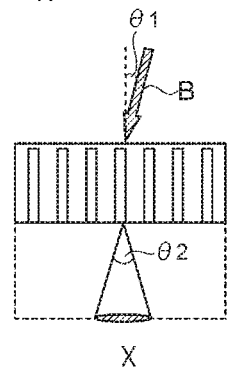

Furthermore, FIG. 2 (a) shows an overall view of the anisotropic light diffusion film 10 which includes a louver structure inside the film, and FIG. 2 (b) shows a cross-sectional view of the anisotropic light diffusion film 10 of FIG. 2 (a) viewed from the X direction.

As shown in the plan view of FIG. 1 (a), the anisotropic light diffusion film 10 is provided with a louver structure 13, in which plate-shaped regions with comparatively high refractive index 12 and plate-shaped regions with comparatively low refractive index 14 are alternately arranged in parallel in any one arbitrary direction along the film plane.

Furthermore, as shown in the cross-sectional view of FIG. 1 (b), the plate-shaped regions with comparatively high refraction index 12 and the plate-shaped regions with comparatively low refractive index 14 have each a predetermined thickness and maintain the state of being alternately arranged in parallel even in the normal direction relative to the anisotropic light diffusion film 10 (the film thickness direction).

As a result, as shown in FIG. 2 (a), it is presumed that, when the angle of the incident light falls within a light diffusion incident angle region, it is diffused by the anisotropic light diffusion film 10.

Namely, as shown in FIG. 1 (b), when the angle of the incident light relative to the anisotropic light diffusion film 10 has a value falling within a predetermined range of angles with respect to the boundary surface 13' of the louver structure 13, that is, a value in a light diffusion incident angle region, it is presumed that the incident light (52, 54), while changing direction, goes through the plate-shaped regions of the louver internal structure with comparatively high refraction index 12 along the film thickness, and thereby, the travelling direction of the light at the emitting surface side is not kept constant.

As a result, it is presumed that, when the incident light falls within the light diffusion incident angle region, it is diffused by the anisotropic light diffusion film 10 and becomes the diffused light (52', 54').

On the other hand, it is presumed that, when the angle of the incident light relative to the anisotropic light diffusion film 10 falls outside the light diffusion incident angle region, as shown in FIG. 1 (b), the incident light 56 is directly transmitted through the anisotropic light diffusion film 10, without being diffused by the anisotropic light diffusion film, and becomes the transmitted light 56'.

Meanwhile, in the present invention, the term "light diffusion incident angle region" means, with respect to the light diffusion film, the range of angles of incident light corresponding to the emission of a diffused light, when the angle of incident light is changed from a point light source.

Furthermore, as shown in FIGS. 2 (a), 4 (a) and 6 (a), due the difference in refractive index and angle of inclination and the like of a louver structure and the like in light diffusion films, such a "light diffusion incident angle region" is an angle region determined for each of such light diffusion films.

Based on the above-described fundamental principles, an anisotropic light diffusion film 10 provided with a louver structure 13, may exhibit, for example, an incident angle dependency in the transmission and diffusion of light as shown in FIG. 2 (a).

Furthermore, as shown in FIG. 2 (a), an anisotropic light diffusion film 10 which includes a louver structure 13, typically, exhibits light diffusion characteristics of "anisotropy".

Here, in the present invention, as shown in FIG. 2 (a), the term "anisotropy" means that, when an incident light is diffused by the film, the diffusion state of light for the emitted light that has been diffused in a plane parallel to the film (shape of expansion of the diffused light) has different properties depending on the direction within the same plane.

More specifically, as shown in FIG. 2 (a), for the direction perpendicular to the louver structure extended along any one arbitrary direction along the film plane, diffusion of light occurs selectively while, for the direction parallel to the louver structure, diffusion of light does not occur easily. Therefore, it is presumed that anisotropic light diffusion is achieved.

Therefore, as shown in FIG. 2 (a), in a light diffusion film presenting anisotropy, the shape of expansion of the diffused light has a rod shape.

Furthermore, as described above, in an anisotropic light diffusion film, because of the occurrence of light diffusion in the perpendicular direction to the direction of the louver structure extended along any one arbitrary direction along the film plane, as shown in FIG. 2 (b), the expression "incident angle θ1" of incident light means the incident angle of the perpendicular component to the direction of the louver structure extended along any one arbitrary direction along the film plane. In addition, this time, the "incident angle θ1" means the angle (°) in a case for which the angle relative to the normal of the incident side surface of the light diffusion film is 0°.

Furthermore, in the present invention, the "light diffusion angle region" means the range of angles of the diffused light obtained by fixing a point light source at an angle for which the incident light is the most diffused.

Moreover, in an anisotropic light diffusion film, the "angle of aperture of the diffused light" is the width of the above-mentioned "light diffusion angle region", and, as shown in FIG. 2 (b), means the angle of aperture 92 of the diffused light in a case for which the cross-section of the film is viewed from a direction (X direction) parallel to the direction of the louver structure extended along any one arbitrary direction along the film plane.

Furthermore, as shown in FIG. 2 (a), an anisotropic light diffusion film is such that, if the angle of the incident light is included in the light diffusion incident angle region, even if the incident angles are different, almost similar light diffusion can be induced at the light emitting surface side.

Therefore, it can be said that the anisotropic light diffusion film thus obtained has a light-converging effect which concentrates light in a predetermined spot.

Meanwhile, in addition to a case where the changes of direction of an incident light inside the region with comparatively high refractive index 12 of the louver structure are of a step-index type, with zigzag changes of direction by total reflection following a straight line as shown in FIG. 1 (b), a case where they are of a gradient-index type, with changes of direction following a curve, is also considered.

Furthermore, in FIGS. 1 (a) and (b), for simplicity, the interface between the plate-shaped region with comparatively high refractive index 12 and the plate-shaped region with comparatively low refractive index 14 is represented by a straight line but, in reality, the interface is slightly meandering and each of the plate-shaped regions is formed of a complex refractive index distribution structure with ramifications and extinctions.

As a result, it is presumed that a distribution of non-uniform optical properties enhances the light diffusion characteristics.

(2) Isotropic Light Diffusion

Next, a light diffusion film having isotropic light diffusion characteristics will be described using FIGS. 3 and 4.

Figure 3A:
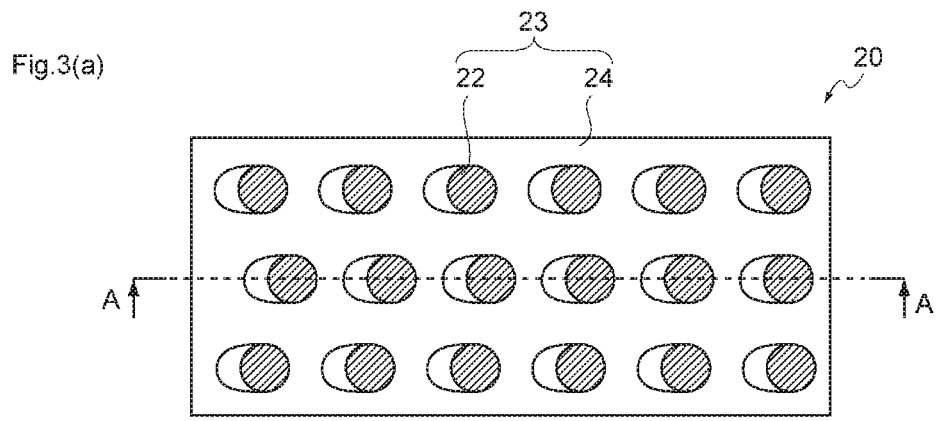
FIGS. 3 (a) and (b) are diagrams provided in order to explain the outline of a light diffusion film which includes a columnar structure inside the film.
Figure 3B:
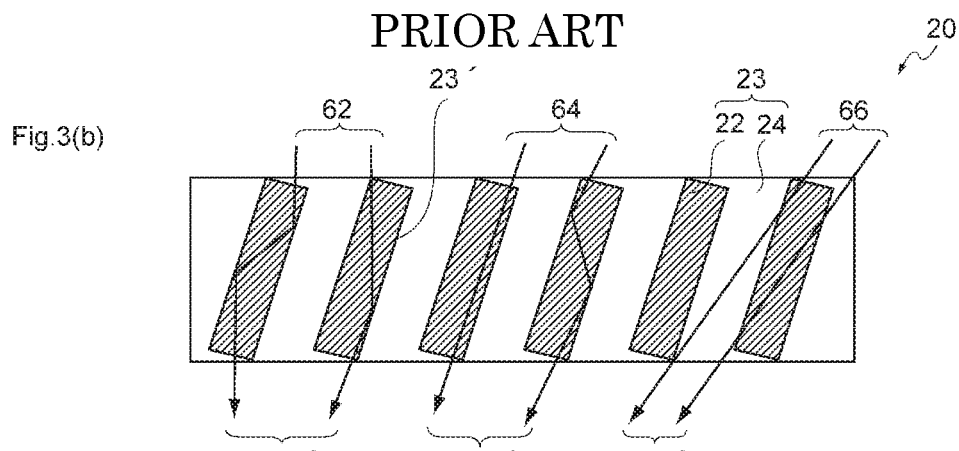

First, FIG. 3 (a) shows a top view (plan view) of an isotropic light diffusion film 20, and FIG. 3 (b) shows a cross-sectional view of the isotropic light diffusion film 20 in a case in which the light diffusion film 20 shown in FIG. 3 (a) is cut in a perpendicular direction along the dotted line A-A, and the cut surface is viewed from the arrow direction.

Figure 4A:
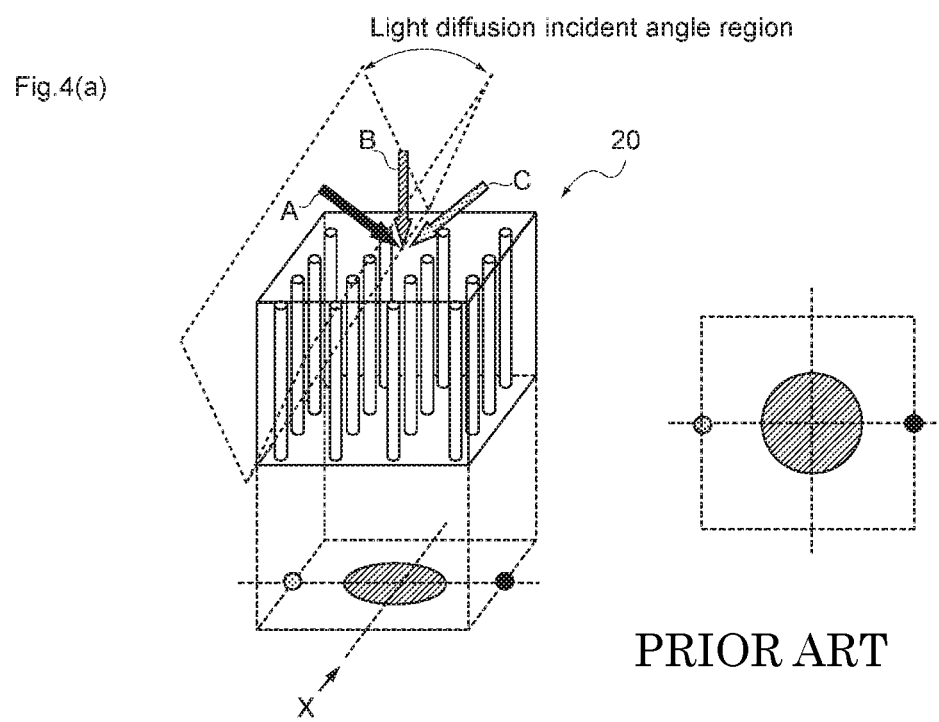
FIGS. 4 (a) and (b) are diagrams provided in order to explain the incident angle dependency and isotropic light diffusion in a light diffusion film which includes a columnar structure inside the film FIGS. 5 (a) and (b) are diagrams provided in order to explain the outline of a light diffusion film of the present invention.
Figure 4B:
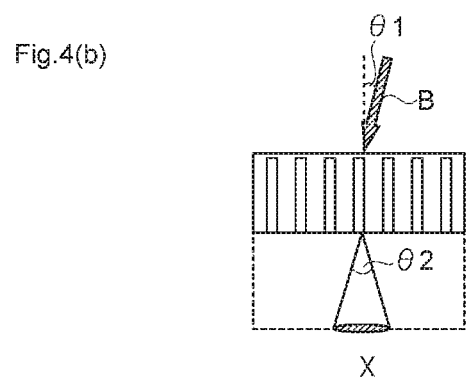

Furthermore, FIG. 4 (a) shows an overall view of the isotropic light diffusion film 20 which includes a columnar structure inside the film, and FIG. 4 (b) shows a cross-sectional view of the isotropic light diffusion film 20 of FIG. 4 (a) viewed from the X direction.

In a plan view such as shown in FIG. 3 (a), the isotropic light diffusion film 20 contains a columnar structure 23 composed of pillars with comparatively high refractive index 22 and a region with comparatively low refractive index 24.

Furthermore, as shown in the cross-sectional view of FIG. 3 (b), the pillars with comparatively high refraction index 22 and the region with comparatively low refractive index 24 maintain the state of being alternately arranged in the normal direction relative to the isotropic light diffusion film 20 (the film thickness direction) with a predetermined width.

As a result, as shown in FIG. 4 (a), it is presumed that, when the angle of the incident light falls within a light diffusion incident angle region, it is diffused by the isotropic light diffusion film 20.

Namely, as shown in FIG. 3 (b), when the angle of the incident light relative to the isotropic light diffusion film 20 has a value falling within a predetermined range of angles with respect to the boundary surface 23' of the columnar structure 23, that is, a value in a light diffusion incident angle region, it is presumed that the incident light (62, 64), while changing direction, goes through the pillars with comparatively high refraction index 22 of the columnar structure 23 along the film thickness, and thereby, the direction of travel of the light at the emitting surface side is not kept constant.

As a result, it is presumed that, when the incident light falls within the light diffusion incident angle region, it is diffused by the isotropic light diffusion film 20, and becomes the diffused light (62', 64').

On the other hand, it is presumed that, when the angle of the incident light relative to the isotropic light diffusion film 20 falls outside the light diffusion incident angle region, as shown in FIG. 3 (b), the incident light 66 is directly transmitted through the isotropic light diffusion film 20, without being diffused by the isotropic light diffusion film, and becomes the transmitted light 66'.

Therefore, based on the same fundamental principles as the above-described anisotropic light diffusion film, an isotropic light diffusion film 20 provided with a columnar structure 23 can exhibit, for example, an incident angle dependency with the transmission and diffusion of light as shown in FIG. 4 (a).

However, as shown in FIG. 4 (a), an isotropic light diffusion film which includes a columnar structure 23, typically, presents light diffusion characteristics of "isotropy".

This is presumed to be due to the fact that, in the columnar structure 23, while light is repeatedly reflected in a step-index or gradient-index way, it goes through the columnar structure similarly, even in a cross-section perpendicular to the cross-section shown in FIG. 3 (b).

Here, in the present invention, the term "isotropy" means that, as shown in FIG. 4 (a), when an incident light is diffused by the film, the diffusion state of light for the emitted light that has been diffused in a plane parallel to the film (shape of expansion of the diffused light) does not change properties depending on the direction within the same plane.

More specifically, as shown in FIG. 4 (a), the diffusion state of the emitted light that has been diffused has a circular shape in a plane parallel to the film.

Furthermore, in an isotropic diffusion film, unlike an anisotropic diffusion film, the direction in which light diffusion occurs is not particularly limited.

Therefore, the expression "incident angle θ1" of the incident angle in an isotropic film means, simply, the angle (°) in a case for which the angle relative to the normal of the incident side surface of the isotropic film is 0°.

Since other contents are redundant with the explanation of the above-described anisotropic light diffusion film, they will be omitted.

2. Fundamental Configuration

Next, a fundamental configuration of a light diffusion film of the present invention having elliptical-shaped light diffusion characteristics will be described using FIGS. 5 and 6.

Figure 5A:
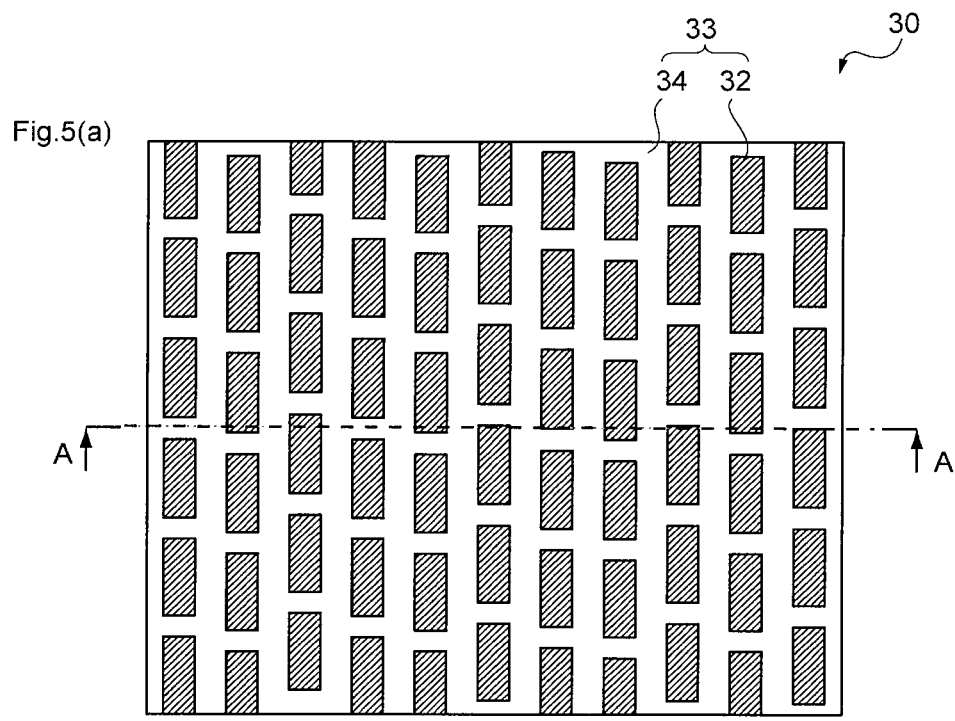

First, FIG. 5 (a) shows a top view (plan view) of an elliptical-shaped light diffusion film 30, and FIG. 5 (b) shows a cross-sectional view of the elliptical-shaped light diffusion film 30 in a case in which the light diffusion film 30 is cut in a perpendicular direction along the dotted line A-A, and the cut surface is viewed from the arrow direction.

Figure 6A:
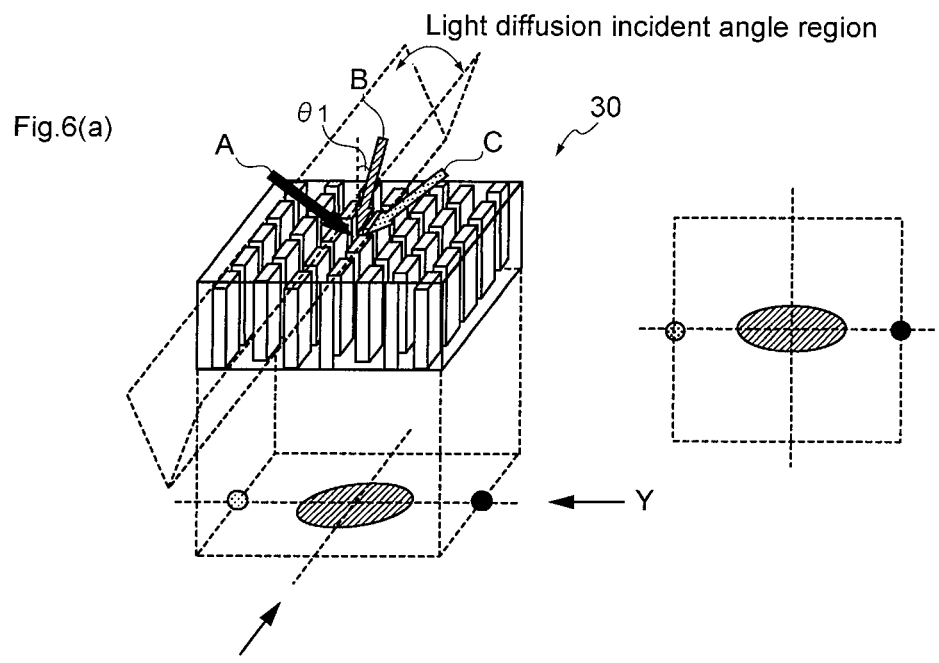
FIGS. 6 (a) to (c) are diagrams provided in order to explain the incident angle dependency and the elliptical-shaped light diffusion in a light diffusion film of the present invention.
Figure 6B:
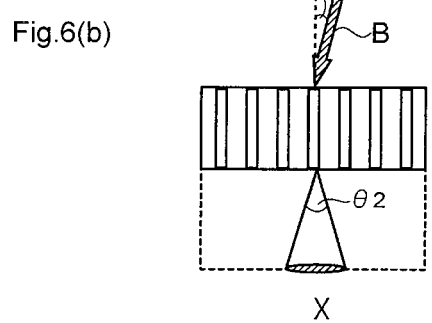
Figure 6C:
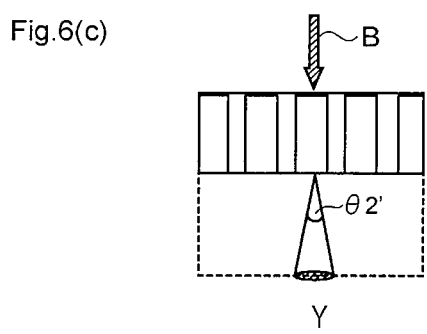

Furthermore, FIG. 6 (a) shows an overall view of the elliptical-shaped light diffusion film 30 which includes a predetermined internal structure inside the film, FIG. 6 (b) shows a cross-sectional view of the elliptical-shaped light diffusion film 30 of FIG. 6 (a) viewed from the X direction, and FIG. 6 (c) shows a cross-sectional view of the elliptical-shaped light diffusion film 30 of FIG. 6 (a) viewed from the Y direction.

In a plan view such as shown in FIG. 5 (a), the elliptical-shaped light diffusion film 30 is provided with a predetermined internal structure 33, in which a plurality of flaky-shaped objects with comparatively high refractive index 32 are arranged in multiple rows in a region with comparatively low refractive index 34 along any one arbitrary direction along the film plane.

Furthermore, the plurality of flaky-shaped objects 32 arranged in one row a separated by a predetermined interval, and the region with comparatively low refractive index 34 is inserted in this gap.

Namely, the flaky-shaped objects 32 are composed of plate-shaped parts that are flanked by two end parts, the end parts being formed by cutting the extension of a louver structure with a comparatively high refractive index with the region with a comparatively low refractive index 34.

Meanwhile, for simplicity, in FIG. 5 (a), the flaky-shaped objects 32 are represented by rectangles but, in reality, their shapes are close to rectangles with round corners.

Furthermore, as shown in the cross-sectional view of FIG. 5 (b), the flaky-shaped objects with comparatively high refraction index 32 and the region with comparatively low refractive index 34 respectively maintain the state of being alternately arranged in the normal direction relative to the elliptical-shaped light diffusion film 30 (the film thickness direction).

Figure 5B:
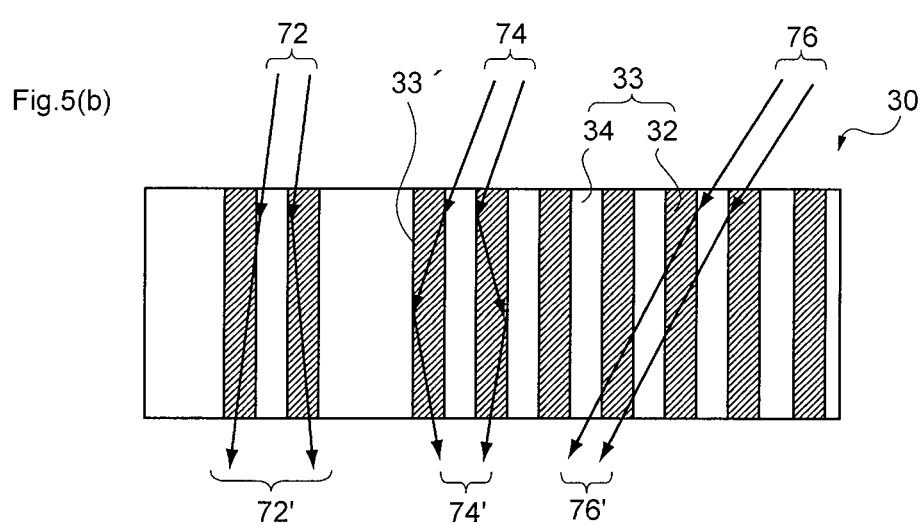

Therefore, based on the same fundamental principles as the above-described anisotropic and isotropic light diffusion films (FIG. 5(b)), an elliptical-shaped light diffusion film 30 provided with a predetermined internal structure 33 can exhibit, for example, an incident angle dependency with the transmission and diffusion of light as shown in FIG. 6 (a).

However, as shown in FIGS. 5 and 6, since the elliptical-shaped light diffusion film 30 has a predetermined internal structure 33 composed of a plurality of flaky-shaped objects with comparatively high refractive index 32 arranged in multiple rows in a region of comparatively low refractive index 34 along any one arbitrary direction along the film plane, it has elliptical-shaped light diffusion characteristics as shown in FIG. 6 (a).

Namely, the predetermined internal structure 33 in the elliptical-shaped light diffusion film 30 has, so to speak, a hybrid structure between a louver structure 13 in an anisotropic light diffusion film 10 and a columnar structure 23 in an isotropic light diffusion film 20.

More specifically, it is presumed that, in the flaky-shaped objects that form the predetermined internal structure, the plate-shaped parts in the center express anisotropic light diffusion and the end parts express isotropic light diffusion.

Because of that, it is presumed that elliptical-shaped light diffusion occurs in the predetermined internal structure.

Namely, in a louver structure, since the plate-shaped regions that form the structure, fundamentally, do not have end parts, light diffusion with strong anisotropy and almost no isotropy, in other words anisotropic light diffusion, occurs.

Furthermore, in a columnar structure, since the pillars that form the structure do not have plate-shaped parts, light diffusion with strong isotropy and almost no anisotropy, in other words isotropic light diffusion, occurs.

Therefore, in the predetermined internal structure provided with flaky-shaped objects having both plate-shaped and end parts, light diffusion occurs, which is intermediary between a louver and a columnar structure, and elliptical-shaped light diffusion combining anisotropy and isotropy is presumed to occur.

Furthermore, in an elliptical-shaped light diffusion film, as shown in FIG. 6 (b), because the major axis direction of the elliptical-shaped light diffusion lies in a direction perpendicular to the arrangement direction of the flaky-shaped objects arranged in multiple rows along any one arbitrary direction along the film plane, the expression "incident angle θ1" of the incident light means the incident angle of the component perpendicular to the arrangement direction of the flaky-shaped objects arranged along any one arbitrary direction along the film plane. In addition, at this point, the "incident angle θ1" means the angle (°) in a case for which the angle relative to the normal of the incident side surface of the light diffusion film is 0°.

Furthermore, in the elliptical-shaped light diffusion film, the "angle of aperture of the diffused light" is defined with two components: the angle of aperture θ2 of the diffused light in the major axis direction, as shown in FIG. 6 (b), when the cross-section of the film is viewed from the X direction parallel to the arrangement direction of the flaky-shaped objects arranged in multiple rows along any one arbitrary direction along the film plane; and the angle of aperture θ2' of the diffused light in the minor axis direction when the cross-section of the film is viewed from the Y direction orthogonal to the X direction, as shown in FIG. 6 (c).

Since other contents are redundant with the explanation of the above-described anisotropic light diffusion film, they will be omitted.

3. Internal Structure

The light diffusion film of the present invention is characterized by having a predetermined internal structure composed of a plurality of flaky-shaped objects with comparatively high refractive index arranged in multiple rows in a region with comparatively low refractive index along any one arbitrary direction along the film plane.

Hereinafter, such a predetermined internal structure will be explained specifically.

(1) Refractive Index

In the predetermined internal structure, it is preferable to adjust the difference between the refractive index of the flaky-shaped objects with comparatively high refractive index and the refractive index of the region with comparatively low relative index to a value of 0.01 or more.

The reason for this is that, by adjusting such a difference between the refractive indices to a value of 0.01 or more, the incident light is stably reflected in the predetermined internal structure, and the incident angle dependency as well as the angle of aperture of the diffused light can be further improved.

That is, if such a difference between the refractive indices has a value of below 0.01, because the range of angles for which an incident light is entirely reflected in the predetermined internal structure narrows, there are cases for which the incident angle dependency is excessively reduced or the angle of aperture of the diffused light narrows excessively.

Therefore, it is more preferable to adjust the difference between the refractive index of the flaky-shaped objects with comparatively high refractive index and the refractive index of the region with comparatively low relative index to a value of 0.05 or more, and even more preferable to adjust it to a value of 0.1 or more.

Meanwhile, although it is preferable to have the largest difference between the refractive indices, from the viewpoint of selecting materials capable of forming the predetermined structure, an upper limit of about 0.3 is considered.

(2) Relation (1)

Figure 7A:
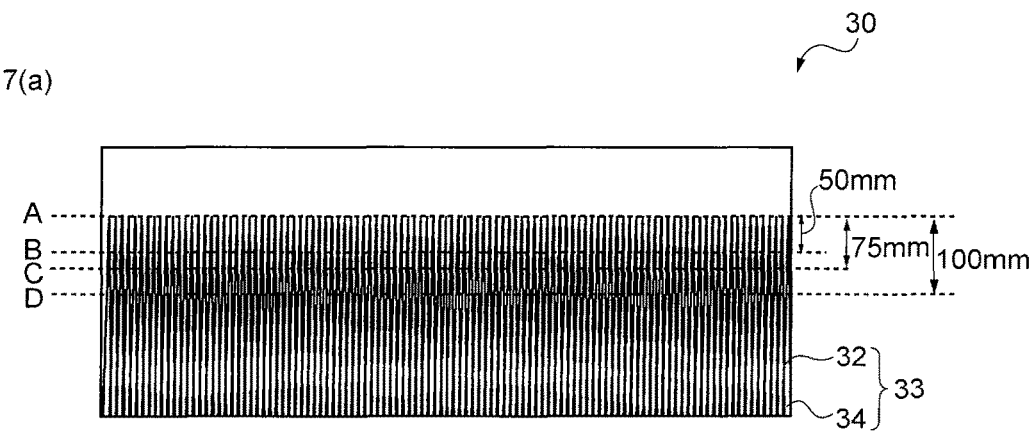
FIGS. 7 (a) to (c) are diagrams provided in order to explain a predetermined internal structure of a light diffusion film of the present invention.
Figure 7B:
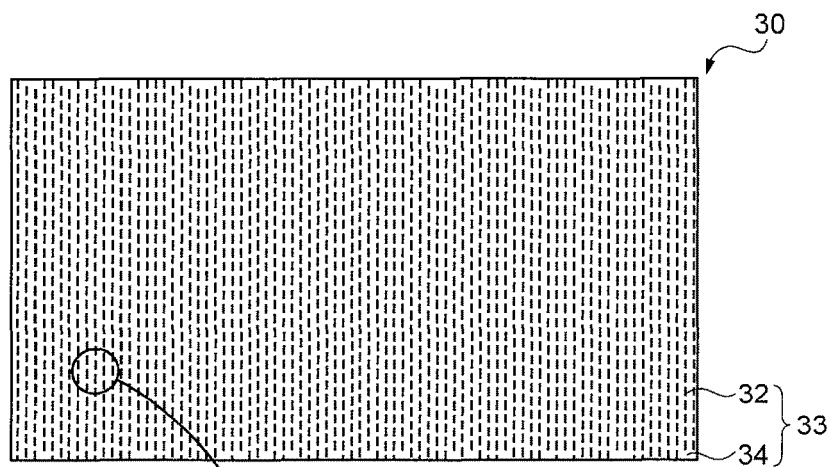
Figure 7C:
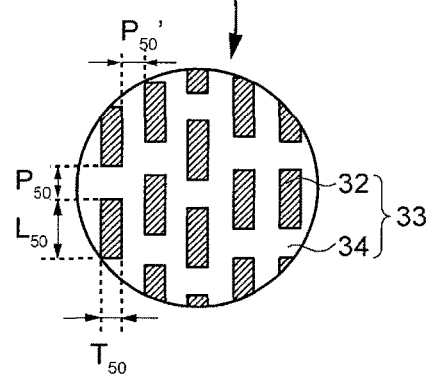

Furthermore, if $T_{50}$ (μm) is the width of the flaky-shaped objects 32 at a position of 50 μm (line B) below the upper end of the flaky-shaped objects 32 (line A) in the direction of the film thickness, as shown in FIGS. 7 (a) to (c), and if $L_{50}$ (μm) is the length of the flaky-shaped objects 32 in their arrangement direction along the film plane, the light diffusion film of the present invention is characterized in that the following relation (1) is satisfied.

Meanwhile, FIG. 7 (a) is a cross-sectional view (side view) of the light diffusion film 30 taken along a plane orthogonal to the arrangement direction along the film plane of the flaky-shaped objects 32, FIG. 7 (b) is a cross-sectional view (top view) of the light diffusion film 30 taken along a plane parallel to the film plane that passes through line B, and FIG. 7 (c) is an enlarged view of a part in the cross-sectional view shown in FIG. 7 (b).

$$0.05 \leq T_{50}/L_{50} < 0.9 \tag{1}$$

The reason for this is that, with $T_{50}$ and $L_{50}$ satisfying the relation (1), inside the film, a predetermined internal structure is formed, which is different from a conventional louver structure and a conventional columnar structure, and an incident light may be diffused into an elliptical shape with respect to a plane parallel to the light diffusion film.

Namely, if the value of $T_{50}/L_{50}$ has a value of below 0.05, light diffusion in the direction parallel to the arrangement direction of the flaky-shaped objects becomes too small, and the light diffusion characteristics may become the same as in an anisotropic film which includes a conventional louver structure. On the other hand, if $T_{50}/L_{50}$ has a value of 0.9 or more, the light diffusion in the direction parallel to the arrangement direction of the flaky-shaped objects becomes too large, light diffusion characteristics may become the same as in an isotropic film which includes a conventional columnar structure.

Here, in the present invention, it does not mean that there exists a particularly preferred value of $T_{50}/L_{50}$ within the numerical range of 0.05 and 0.9 (not included). By appropriate change of the value of $T_{50}/L_{50}$ within such a numerical range, the ellipticity of the elliptical-shaped light diffusion range for various applications can be controlled.

However, from the viewpoint of differentiating more clearly the present invention from conventional anisotropic and isotropic diffusion films, if $T_{50}$ (μm) is the width of the flaky-shaped objects at a position of 50 μm below the upper end of the flaky-shaped objects in the direction of the film thickness, and if $L_{50}$ (μm) is the length of the flaky-shaped objects in their arrangement direction along the film plane, the following relation (1') is more preferably satisfied and the following relation (1") is even more preferably satisfied.

$$0.08 \leq T_{50}/L_{50} \leq 0.8 \tag{1'}$$

$$0.1 \leq T_{50}/L_{50} \leq 0.5 \tag{1"}$$

Furthermore, it is preferable to adjust the width $T_{50}$ (μm) of the flaky-shaped objects 32 at a position of 50 μm (line B) below the upper end of the flaky-shaped objects 32 (line A), as shown in FIGS. 7 (a) to (c), to a value in the range of 0.1 to 15 μm.

The reason for this is that, by adjusting the width $T_{50}$ of the flaky-shaped objects to a value in such a range, an incident light may be more effectively diffused into an elliptical shape.

Namely, if the width $T_{50}$ of such flaky-shaped objects has a value of below 0.1 μm, regardless of the angle of the incident light, it may become difficult to exhibit light diffusion characteristics. On the other hand, if the width $T_{50}$ of such flaky-shaped objects has a value exceeding 15 μm, an increasing amount of light goes straight through the flaky-shaped objects and is transmitted as it is, and the uniformity of the diffused light may be decreased.

Therefore, it is more preferable to adjust the width $T_{50}$ of the flaky-shaped objects at a position of 50 μm below the upper end of the flaky-shaped objects to a value in the range of 0.5 to 10 μm, and even more preferable to adjust it to a value in the range of 1 to 5 μm.

Furthermore, it is preferable to adjust the length $L_{50}$ (μm) of the flaky-shaped objects 32 in their arrangement direction along the film plane at a position of 50 μm (line B) below the upper end of the flaky-shaped objects 32 (line A), as shown in FIGS. 7 (a) to (c), to a value in the range of 0.11 to 300 μm.

The reason is that, by adjusting the length $L_{50}$ of the flaky-shaped objects to a value in such a range, the incident light may be more effectively diffused into an elliptical shape.

Namely, if the length $L_{50}$ of such flaky-shaped objects has a value of below 0.11 μm, regardless of the angle of the incident light, it may become difficult to exhibit light diffusion characteristics. On the other hand, if the length $L_{50}$ of such flaky-shaped objects has a value exceeding 300 μm, the light diffusion in the direction parallel to the arrangement direction of the flaky-shaped objects becomes too small and the light diffusion characteristics may become the same as in an anisotropic film which includes a conventional louver structure.

Therefore, it is more preferable to adjust the length $L_{50}$ of the flaky-shaped objects in their arrangement direction along the film plane at a position of 50 μm below the upper end of the flaky-shaped objects to a value in the range of 0.56 to 200 μm and even more preferable to adjust it to a value in the range of 1.1 to 100 μm.

Furthermore, it is preferable to adjust the distance $P_{50}$ between the plurality of flaky-shaped objects 32 in the arrangement direction along the film plane of the flaky-shaped objects 32 at a position of 50 μm (line B) below the upper end of the flaky-shaped objects 32 (line A), as shown in FIGS. 7 (a) to (c), to a value in the range of 0.1 to 100 μm.

The reason for this is that, if the distance $P_{50}$ between such plurality of flaky-shaped objects has a value of below 0.1 μm, regardless of the angle of the incident light, it may become difficult to exhibit light diffusion characteristics. On the other hand, if the distance $P_{50}$ of such flaky-shaped objects has a value exceeding 100 μm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance $P_{50}$ between the plurality of flaky-shaped objects in the arrangement direction along the film plane of the flaky-shaped objects at a position of 50 μm below the upper end of the flaky-shaped objects to a value in the range of 0.5 to 75 μm and even more preferable to adjust it to a value in the range of 1 to 50 μm.

Moreover, it is preferable to adjust the distance $P_{50}'$ between the rows of flaky-shaped objects 32 arranged in multiple rows at a position of 50 μm (line B) below the upper end of the flaky-shaped objects 32 (line A), as shown in FIGS. 7 (a) to (c), to a value in the range of 0.1 to 15 μm.

The reason for this is that, if the value of the distance $P_{50}'$ between the rows of such flaky-shaped objects has a value below 0.1 μm, regardless of the angle of the incident light, it may become difficult to exhibit light diffusion characteristics. On the other hand, if the distance $P_{50}'$ of such flaky-shaped objects has a value exceeding 15 μm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance $P_{50}'$ between the rows of flaky-shaped objects arranged in multiple rows at a position of 50 μm below the upper end of the flaky-shaped objects to a value in the range of 0.5 to 10 μm and even more preferable to adjust it in the range of 1 to 5 μm.

(3) Relation (2)

Furthermore, it is preferable that the length L of the flaky-shaped objects in their arrangement direction along the film plane be lengthened downward from the upper end side in the thickness direction of the light diffusion film.

Furthermore, it is preferable that the width T of the flaky-shaped objects be thickened downward from the upper end side in the thickness direction of the light diffusion film.

The reason for this is that, by configuring the predetermined internal structure in this way, incident light can be even more effectively diffused into an elliptical shape.

That is, by increasing on the whole the cross-sectional area of the flaky-shaped objects downward from the upper end side, it is presumed that return light is prevented and that diffusion of the emitted light is promoted.

More specifically, if $T_{75}$ (μm) is the width of the flaky-shaped objects 32 at a position of 75 μm (line C) below the upper end of the flaky-shaped objects 32 (line A) in the direction of the thickness of the light diffusion film 30, as shown in FIG. 7 (a) and FIGS. 8 (a) and (b), and if $L_{75}$ (μm) is the length of the flaky-shaped objects 32 in their arrangement direction along the film plane, the following relation (2) is preferably satisfied.

Figure 8A:
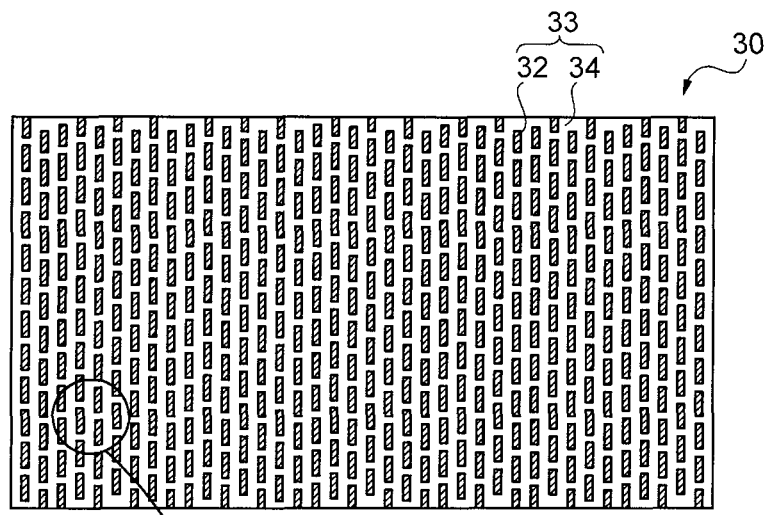
FIGS. 8 (a) and (b) are other diagrams provided in order to explain a predetermined internal structure of a light diffusion film of the present invention.
Figure 8B:
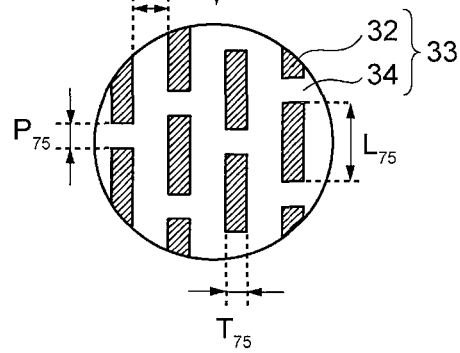

FIG. 8 (a) is a cross-sectional view (top view) of the light diffusion film 30 taken along a plane parallel to the film plane that passes through line C and FIG. 8 (b) is an enlarged view of a part in the cross-sectional view shown in FIG. 8 (a).

$$0.01 \leq T_{75}/L_{75} < 0.5 \quad (2)$$

The reason is that, if $T_{75}/L_{75}$ has a value of below 0.01, light diffusion in the direction parallel to the arrangement direction of the flaky-shaped objects becomes too small, and the light diffusion characteristics may become the same as in an anisotropic film which includes a conventional louver structure. On the other hand, if $T_{75}/L_{75}$ has a value of 0.5 or more, light diffusion in the direction parallel to the arrangement direction of the flaky-shaped objects becomes too large, the light diffusion characteristics may become the same as in an isotropic film which includes a conventional columnar structure.

Here, in the present invention, it does not mean that there exists a particularly preferred value of $T_{75}/L_{75}$ within the numerical range of 0.01 to 0.5 (not included). By appropriate change of the value of $T_{75}/L_{75}$ within such a numerical range, the ellipticity of the elliptical-shaped light diffusion for various applications can be controlled.

However, from the viewpoint of differentiating more clearly the present invention from conventional anisotropic and conventional isotropic diffusion films, if $T_{75}$ (μm) is the width of the flaky-shaped objects at a position of 75 μm below the upper end of the flaky-shaped objects in the direction of the film thickness, and if $L_{75}$ (μm) is the length of the flaky-shaped objects in their arrangement direction along the film plane, the following relation (2') is more preferably satisfied and the following relation (2") is even more preferably satisfied.

$$0.02 \leq T_{75}/L_{75} \leq 0.2 \quad (2')$$

$$0.05 \leq T_{75}/L_{75} \leq 0.1 \quad (2'')$$

Furthermore, it is preferable to adjust the width $T_{75}$ (μm) of the flaky-shaped objects 32 at a position of 75 μm (line C) below the upper end of the flaky-shaped objects 32 (line A), as shown in FIG. 7 (a) and FIGS. 8 (a) and (b), to a value in the range of 0.1 to 15 μm.

The reason is that, if the width $T_{75}$ of such flaky-shaped objects has a value of below 0.1 μm, regardless of the angle of the incident light, it may become difficult to exhibit light diffusion characteristics. On the other hand, if the width $T_{75}$ of such flaky-shaped objects has a value exceeding 15 μm, an increasing amount of light goes straight through the flaky-shaped objects and is transmitted as it is, and the uniformity of the diffused light may be decreased.

Therefore, it is more preferable to adjust the width $T_{75}$ of the flaky-shaped objects at a position of 75 μm below the upper end of the flaky-shaped objects to a value in the range of 0.5 to 10 μm, and even more preferable to adjust it to a value in the range of 1 to 5 μm.

Furthermore, it is preferable to adjust the length $L_{75}$ (μm) of the flaky-shaped objects 32 in their arrangement direction along the film plane at a position of 75 μm (line C) below the upper end of the flaky-shaped objects 32 (line A), as shown in FIG. 7 (a) and FIGS. 8 (a) and (b), to a value in the range of 0.2 to 1500 μm.

The reason is that, if the length $L_{75}$ of such flaky-shaped objects has a value of below 0.2 μm, regardless of the angle of the incident light, it may become difficult to exhibit light diffusion characteristics. On the other hand, if the length $L_{75}$ of such flaky-shaped objects has a value exceeding 1500 μm, the light diffusion in the direction parallel to the arrangement direction of the flaky-shaped objects becomes too small and the light diffusion characteristics may become the same as in an anisotropic film which includes a conventional louver structure.

Therefore, it is more preferable to adjust the length $L_{75}$ of the flaky-shaped objects in their arrangement direction along the film plane at a position of 75 μm below the upper end of the flaky-shaped objects to a value in the range of 1 to 1000 μm and even more preferable to adjust it to a value in the range of 2 to 500 μm.

Furthermore, it is preferable to adjust the distance $P_{75}$ between the plurality of flaky-shaped objects 32 in their arrangement direction along the film plane of the flaky-shaped objects 32 at a position of 75 μm (line C) below the upper end of the flaky-shaped objects 32 (line A), as shown in FIG. 7 (a) and FIGS. 8 (a) and (b), to a value in the range of 0.1 to 100 μm.

The reason for this is that, if the distance $P_{75}$ between such plurality of flaky-shaped objects has a value of below 0.1 μm, regardless of the angle of the incident light, it may become difficult to exhibit light diffusion characteristics. On the other hand, if the distance $P_{75}$ of such flaky-shaped objects has a value exceeding 100 μm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance $P_{75}$ between the plurality of flaky-shaped objects in the arrangement direction along the film plane of the flaky-shaped objects at a position of 75 μm below the upper end of the flaky-shaped objects to a value in the range of 0.5 to 75 μm and even more preferable to adjust it to a value in the range of 1 to 50 μm.

Furthermore, it is preferable to adjust the distance $P_{75}'$ between the rows of flaky-shaped objects 32 arranged in multiple rows at a position of 75 μm (line C) below the upper end of the flaky-shaped objects 32 (line A), as shown in FIG. 7 (a) and FIGS. 8 (a) and (b), to a value within the range of 0.1 to 15 μm.

The reason for this is that, if the distance $P_{75}'$ between the rows of such flaky-shaped objects has a value of below 0.1 μm, regardless of the angle of the incident light, it may become difficult to exhibit light diffusion characteristics. On the other hand, if the distance $P_{75}'$ of such flaky-shaped objects has a value exceeding 15 μm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance P75' between the rows of flaky-shaped objects arranged in multiple rows at a position of 75 μm below the upper end of the flaky-shaped objects to a value in the range of 0.5 to 10 μm and even more preferable to adjust it to a value in the range of 1 to 5 μm.

(4) Relation (3)

Furthermore, if $T_{100}$ (μm) is the width of the flaky-shaped objects 32 at a position of 100 μM (line D) below the upper end of the flaky-shaped objects 32 (line A) in the direction of the thickness of the light diffusion film 30, as shown in FIG. 7 (a) and FIGS. 9 (a) and (b), and if $L_{100}$ (μm) is the length of the flaky-shaped objects 32 in their arrangement direction along the film plane at the same position, the following relation (3) is preferably satisfied.

Figures 9A, 9B:
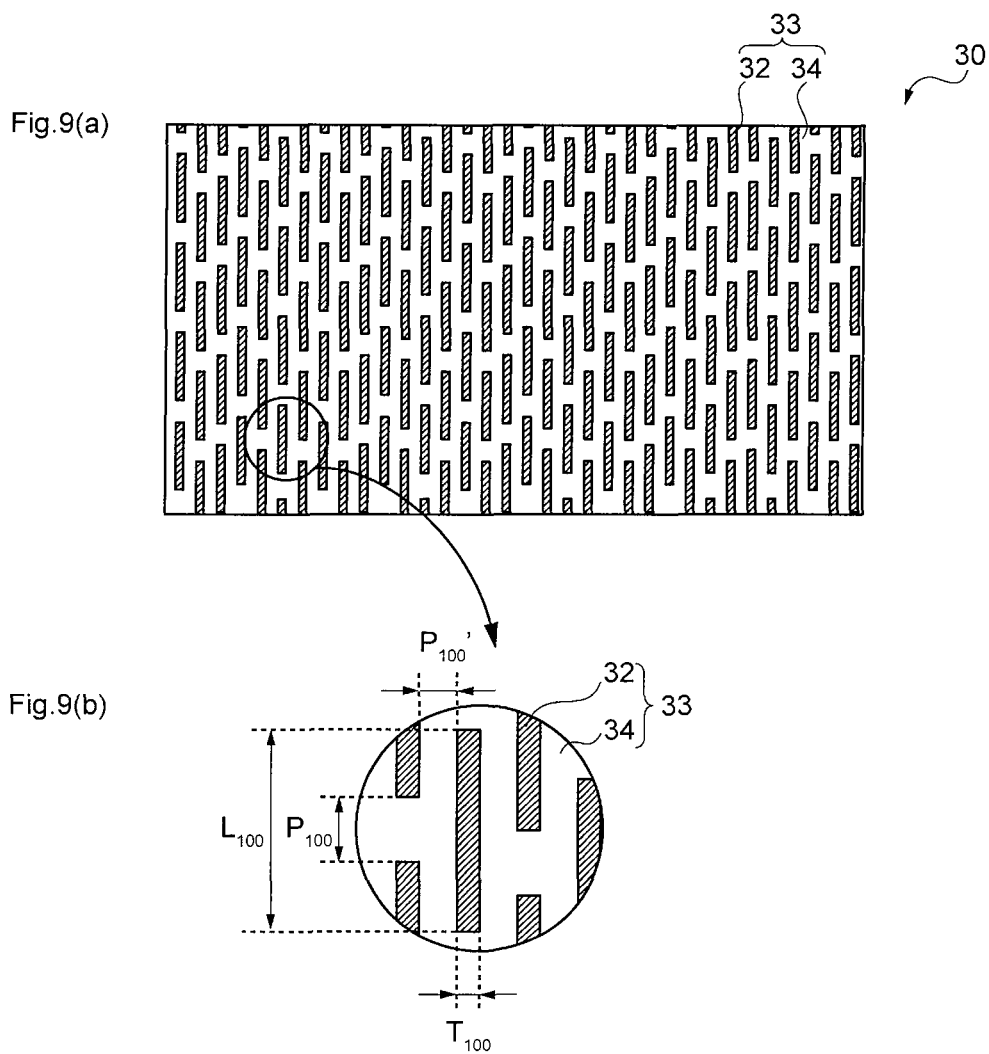
FIGS. 9 (a) and (b) are still other diagrams provided in order to explain a predetermined internal structure of a light diffusion film of the present invention.

FIG. 9 (a) is a cross-sectional view (top view) of the light diffusion film 30 taken in a plane parallel to the film plane that passes through line D. FIG. 9 (b) is an enlarged view of a part in the cross-sectional view shown in FIG. 9 (a).

$$0.005 \leq T_{100}/L_{100} \leq 0.1 \quad (3)$$

The reason is that, if the value of $T_{100}/L_{100}$ has a value of below 0.005, light diffusion in the direction parallel to the arrangement direction of the flaky-shaped objects becomes too small, and the light diffusion characteristics may become the same as in an anisotropic film which includes a conventional louver structure. On the other hand, if $T_{100}/L_{100}$ has a value exceeding 0.1, light diffusion in the direction parallel to the arrangement direction of the flaky-shaped objects becomes too large, the light diffusion characteristics may become the same as in an isotropic film which includes a conventional columnar structure.

Here, in the present invention, it does not mean that there exists a particularly preferred value of $T_{100}/L_{100}$ within the numerical range of 0.005 to 0.1 (not included). By appropriate change of the value of $T_{100}/L_{100}$ within such a numerical range, the ellipticity of the elliptical-shaped light diffusion for various applications can be controlled.

However, from the viewpoint of differentiating more clearly the present invention from conventional anisotropic and conventional isotropic diffusion films, if $T_{100}$ (μm) is the width of the flaky-shaped objects at a position of 100 μm below the upper end of the flaky-shaped objects in the direction of the film thickness, and if $L_{100}$ (μm) is the length of the flaky-shaped objects in their arrangement direction along the film plane at the same position, the following relation (3') is more preferably satisfied and the following relation (3") is even more preferably satisfied.

$$0.008 \leq T_{100}/L_{100} \leq 0.08 \quad (3')$$

$$0.01 \leq T_{100}/L_{100} \leq 0.06 \quad (3'')$$

Furthermore, it is preferable to adjust the width $T_{100}$ (μm) of the flaky-shaped objects 32 at a position of 100 μm (line D) below the upper end of the flaky-shaped objects 32 (line A), as shown in FIG. 7 (a) and FIGS. 9 (a) and (b), to a value in the range of 0.1 to 15 μm.

The reason is that, if the width $T_{100}$ of such the flaky-shaped objects has a value of below 0.1 μm, regardless of the angle of the incident light, it may become difficult to exhibit light diffusion characteristics. On the other hand, if the width $T_{100}$ of such flaky-shaped objects has a value exceeding 15 μm, an increasing amount of light goes straight through the flaky-shaped objects and is transmitted as it is, and the uniformity of the diffused light may be decreased.

Therefore, it is more preferable to adjust the width $T_{100}$ of the flaky-shaped objects at a position of 100 μm below the upper end of the flaky-shaped objects to a value in the range of 0.5 to 10 μm, and even more preferable to adjust it to value in the range of 1 to 5 μm.

Furthermore, it is preferable to adjust the length $L_{100}$ (μm) in their arrangement direction along the film plane of the flaky-shaped objects 32 at a position of 100 μm (line D) below the upper end of the flaky-shaped objects 32 (line A), as shown in FIG. 7 (a) and FIGS. 9 (a) and (b), to a value in the range of 1 to 3000 μm.

The reason is that, if the length $L_{100}$ of the flaky-shaped objects has a value of below 1 μm, regardless of the angle of the incident light, it may become difficult to exhibit light diffusion characteristics. On the other hand, if the length $L_{100}$ of the flaky-shaped objects has a value exceeding 3000 µm, the light diffusion in the direction parallel to the arrangement direction of the flaky-shaped objects becomes too small and the light diffusion characteristics may become the same as in an anisotropic film which includes a conventional louver structure.

Therefore, it is more preferable to adjust the length $L_{100}$ of the flaky-shaped objects in their arrangement direction along the film plane at a position of 100 µm below the upper end of the flaky-shaped objects to a value in the range of 5 to 2000 µm and even more preferable to adjust it to a value in the range of 10 to 1000 µm.

Furthermore, it is preferable to adjust the distance $P_{100}$ between the plurality of flaky-shaped objects 32 in the arrangement direction along the film plane of the flaky-shaped objects 32 at a position of 100 µm (line D) below the upper end of the flaky-shaped objects 32 (line A), as shown in FIG. 7 (a) and FIGS. 9 (a) and (b), to a value within the range of 0.1 to 100 µm.

The reason for this is that, if the distance $P_{100}$ between the plurality of such flaky-shaped objects has a value of below 0.1 µm, regardless of the angle of the incident light, it may become difficult to exhibit light diffusion characteristics. On the other hand, if the distance $P_{100}$ of such flaky-shaped objects has a value exceeding 100 µm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance $P_{100}$ between the plurality of flaky-shaped objects in the arrangement direction along the film plane of the flaky-shaped objects at a position of 100 µm below the upper end of the flaky-shaped objects to a value in the range of 0.5 to 75 µm and even more preferable to adjust it to a value in the range of 1 to 50 µm.

Furthermore, it is preferable to adjust the distance $P_{100}'$ between the rows of the flaky-shaped objects 32 arranged in multiple rows at a position of 100 µm (line D) below the upper end of the flaky-shaped objects 32 (line A), as shown in FIG. 7 (a) and FIGS. 9 (a) and (b), to a value within the range of 0.1 to 15 µm.

The reason for this is that, if the distance $P_{100}'$ between the rows of such flaky-shaped objects has a value of below 0.1 µm, regardless of the angle of the incident light, it may become difficult to exhibit light diffusion characteristics. On the other hand, if the value of the distance $P_{100}'$ of such flaky-shaped objects has a value exceeding 15 µm, an increasing amount of light goes outside the flaky-shaped objects, in other words, goes straight through the region with low refractive index, and is transmitted as it is, and the uniformity of the diffused light may be decreased.

Therefore, it is more preferable to adjust the distance P100' between the rows of the flaky-shaped objects arranged in multiple rows at a position of 100 µm below the upper end of the flaky-shaped objects to a value in the range of 0.5 to 10 µm and even more preferable to adjust it to a value in the range of 1 to 5 µm.

(5) Length in the Film Thickness Direction

Figure 10A:
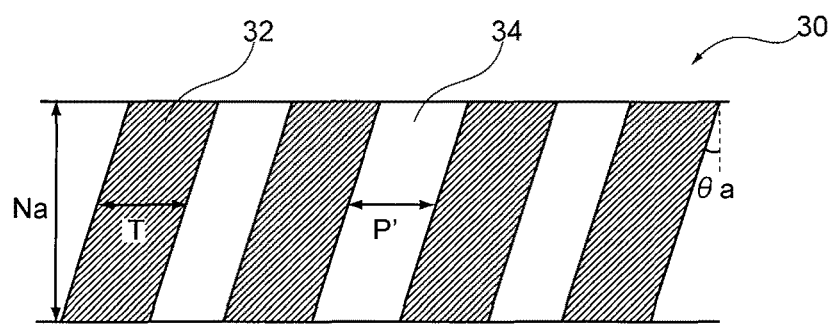
FIGS. 10 (a) to (c) are diagrams provided in order to explain embodiments of a predetermined internal structure of a light diffusion film of the present invention.
Figure 10B:
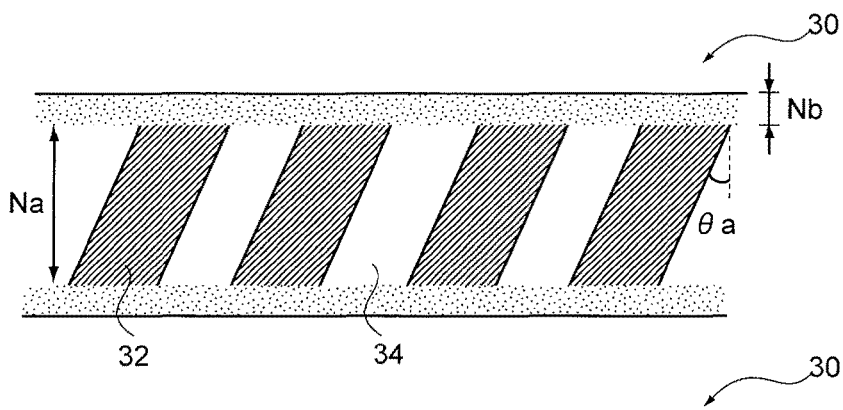
Figure 10C:
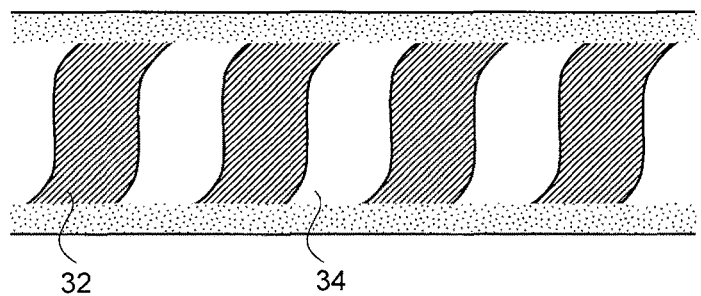

Furthermore, it is preferable to adjust the value of the length Na of the flaky-shaped objects 32 in the film thickness direction, as shown in FIGS. 10 (a) and (b), to a value in the range of 50 to 500 µm.

The reason is that, if such length Na has a value of below 50 µm, there is increasing amount of incident light completely going straight through the predetermined internal structure, and it may be difficult to obtain sufficient incident light dependency and angle of aperture for the diffused light. On the other hand, if such a length Na has a value exceeding 500 µm, when forming the predetermined internal structure by irradiating an active energy ray on the composition for light diffusion film, the photopolymerization advancing direction is completely diffused by the predetermined structure formed at an early stage, and it may become difficult to form the desired internal structure.

Therefore, it is more preferable to adjust the length Na of the flaky-shaped objects in the film thickness direction to a value in the range of 70 and 300 µm, and even more preferable to adjust to a value in the range of 80 to 200 µm.

Meanwhile, as shown in FIG. 10 (b), the predetermined internal structure may also not be formed up to the upper and lower end parts in the thickness direction of the film.

In that case, even though it also depends on the thickness of the film, generally, it is more preferable to adjust the width Nb of the upper and lower end portions in which the predetermined structure is not formed to a value in the range of 0 to 50 µm, and even more preferable to adjust it to a value in the range of 0 to 5 µm.

(6) Angle of Inclination

Furthermore, as shown in FIGS. 10 (a) and (b), it is preferable to incline the flaky-shaped objects 32 to a certain angle of inclination θa with respect to the thickness of the film 30.

The reason for this is that, by inclining the flaky-shaped objects to a certain angle of inclination θa, the light diffusion incident angle region may be adjusted.

Meanwhile, θa is the angle of inclination that is measured in the cross-section of the film along a perpendicular plane with respect to the arrangement direction of the flaky-shaped objects, and means the angle of inclination (≤) of the flaky-shaped objects in a case for which the angle of the normal with respect to the surface of the film is 0°.

More specifically, as shown in FIGS. 10 (a) and (b), among the angles that are formed between the upper end of the flaky-shaped objects 32 and the normal to the upper end surface of the predetermined internal structure, it means the angle of the narrow side. Meanwhile, the angle of inclination when the flaky-shaped objects 32 are inclined to the right side, as shown in FIGS. 10 (a) and (b), is used as a standard and the angle of inclination when the flaky-shaped objects 32 are inclined to the left side is written with a minus sign.

Furthermore, as shown in FIG. 10 (c), it is also preferable that the flaky-shaped objects be curved.

The reason is that, by having the flaky-shaped objects 32 curved, a decreasing amount of light goes completely straight through the predetermined internal structure and thereby, the uniformity of the light diffusion can be improved.

Meanwhile, when irradiating with an active energy ray, flaky-shaped objects curved in this way can be obtained by irradiating light while changing the irradiation angle of the irradiation light, but it depends strongly on the type of material that forms the predetermined internal structure.

4. Film Thickness

Furthermore, it is preferable to adjust the thickness of the light diffusion film to a value in the range of 100 to 500 µm.

The reason for that is, by adjusting the thickness of the light diffusion film to a value in such a range, superior incident angle dependency can be obtained.

Namely, if the thickness of the light diffusion film has a value of below 100 µm, there is increasing amount of incident light completely going straight through the predetermined internal structure, and it may be difficult to exhibit light diffusion properties. On the other hand, if the thickness of the light diffusion film has a value exceeding 500 µm, when forming the predetermined internal structure by irradiating an active energy ray to the coating layer, the photopolymerization advancing direction is completely diffused by the internal structure that has been formed at an early stage, and it may become difficult to form the desired internal structure.

Therefore, it is more preferable to adjust the thickness of the light diffusion film to a value in the range of 130 and 300 µm, and even more preferable to adjust to a value in the range of 150 to 250 µm.

5. Pressure-Sensitive Adhesive Layer

Furthermore, a light diffusion film of the present invention may also be provided with a pressure-sensitive adhesive layer for laminating one or both sides to an adherent.

The pressure-sensitive adhesive that forms such a pressure-sensitive adhesive layer is not particularly limited and conventionally known pressure-sensitive adhesives, such as acrylic, silicone, urethane, rubber and the like, can be used.

6. Elliptical-Shaped Light Diffusion

Furthermore, as shown in FIGS. 6 (b) and (c), if $\theta 2(°)$ is the angle of aperture of the diffused light in the major axis direction obtained when incident light is diffused by the light diffusion film, and if $\theta 2'(°)$ is the angle of aperture of the diffused light in the minor axis direction, the following relation (4) is preferably satisfied:

$$0.2 \leq \theta 2'/\theta 2 \leq 0.9 \qquad (4)$$

The reason is that, by satisfying the relation (4), applicability to rectangular displays may be further improved.

That is, if $\theta 2'/\theta 2$ has a value of below 0.2, the light diffusion film nearly becomes an anisotropic light diffusion film and it may be difficult to light up the whole display surface. On the other hand, if $\theta 2'/\theta 2$ has a value exceeding 0.9, the light diffusion film nearly becomes an isotropic light diffusion film and there may be wasted diffused light in the rectangular display.

Here, in the present invention, it does not mean that there exists a particularly preferred value of $\theta 2'/\theta 2$ within the numerical range of 0.2 to 0.9. By appropriate change of the value of $\theta 2'/\theta 2$ within such a numerical range, optimal elliptical-shaped light diffusion for various applications may be obtained.

However, from the viewpoint of differentiating more clearly the present invention from conventional anisotropic and isotropic diffusion films, if $\theta 2(°)$ is the angle of aperture of the diffused light in the major axis direction obtained when incident light is diffused by the light diffusion film, and if $\theta 2'(°)$ is the angle of aperture of the diffused light in the minor axis direction, the following relation (4') is more preferably satisfied and the following relation (4") is even more preferably satisfied.

$$0.3 \leq \theta 2'/\theta 2 \leq 0.8 \qquad (4')$$

$$0.4 \leq \theta 2'/\theta 2 \leq 0.7 \qquad (4'')$$

7. Production Method

Furthermore, a light diffusion film of the present invention may be produced by a production method which comprises the following steps (a) to (c):

(a) A step of preparing a composition for light diffusion film;

(b) A step of applying the composition for light diffusion film on a process sheet and forming a coating layer;

(c) A step of subjecting the coating layer to an active energy ray irradiation, wherein, on the surface of the coating layer, at any one arbitrary point situated on a region where the illuminance of the active energy ray coming from an active energy ray light source becomes maximum, the azimuth direction for which the incident angle width of the active energy ray takes a minimum value is orthogonal to the azimuth direction for which the incident angle width of the active energy ray takes a maximum value, and, wherein the minimum value of the incident angle width of the active energy ray is adjusted to 10° or less, and the maximum value of the incident angle width of the active energy ray is adjusted in the range of 10° (not included) to 40°.

Hereinafter, such production method will be explained specifically, with reference to the drawings.

(1) Step (a): Step of Preparing a Composition for Light Diffusion Film.

Such step is a step of preparing a predetermined composition for light diffusion film.

More specifically, it is a step of mixing at least two polymerizable compounds having different refractive indices, a photopolymerizable initiator and, if desired, other additives.

Furthermore, when mixing, the mixture may be stirred at room temperature but, from the viewpoint of improving uniformity, for example, it is preferable to stir the mixture under heating conditions at 40° C. to 80° C. to obtain a uniform liquid mixture.

Furthermore, in order to attain a desired viscosity suitable for coating, it is also preferable to further add a diluent solvent.

Hereinafter, the composition for light diffusion film will be explained more specifically.

(1)-1 High Refractive Index Polymerizable Compound (i) Type of Polymerizable Compound Between the two polymerizable compounds having different refractive indices, the type of polymerizable compound with comparatively high refractive index (hereinafter, may be referred to as component (A)) is not particularly limited, but it is preferable to use a (meth)acrylic ester containing a plurality of aromatic rings as main component for the polymerizable compound.

The reason for this is presumed to be that, when a particular (meth)acrylic ester is incorporated as the component (A), the polymerization rate of the component (A) can be made faster than the polymerization rate of the polymerizable compound having a lower refractive index (hereinafter, may be referred to as component (B)), so as to induce a predetermined difference between the polymerization rates of these components, and thus copolymerizability of the two components can be effectively decreased.

As a result, when the composition is photocured, in the region with comparatively low refractive index originating from the component (B), a predetermined internal structure can be formed efficiently which is composed of a plurality of flaky-shaped objects with comparatively high refractive index originating from the component (A), arranged in multiple rows in a region of comparatively low refractive index along any one arbitrary direction along the film plane.

Furthermore, it is presumed that, by incorporating a particular (meth)acrylic ester as the component (A), sufficient compatibility with the component (B) is obtained when the component (A) is at the stage of a monomer, but at the stage of multiple connections in the course of polymerization, the compatibility with the component (B) can be decreased to a predetermined extent, and the predetermined internal structure can be formed even more efficiently.

Moreover, by incorporating a particular (meth)acrylic ester as the component (A), the refractive index of the region originating from the component (A) in the predetermined internal structure can be increased, and the difference thereof with the refractive index of the region originating from the component (B) can be adjusted to a value greater than or equal to a predetermined value.

Therefore, by incorporating a particular (meth)acrylic ester as the component (A), together with the characteristics of the component (B) that will be described below, a predetermined internal structure can be formed efficiently, which is composed of a plurality of flaky-shaped objects with comparatively high refractive index arranged in multiple rows in a region of comparatively low refractive index along any one arbitrary direction along the film plane.

Meanwhile, the term "(meth)acrylic ester containing a plurality of aromatic rings" means a compound having a plurality of aromatic rings in the ester residue moiety of the (meth)acrylic ester.

Furthermore, "(meth)acrylic" means both acrylic and methacrylic.

Furthermore, examples of a (meth)acrylic ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate and the like, or compounds in which some of hydrogen atoms on the aromatic ring have been substituted by halogen, alkyl, alkoxy, halogenated alkyl, or the like.

Furthermore, as the (meth)acrylic ester containing a plurality of aromatic rings as the component (A), it is preferable for the composition for light diffusion film to contain a compound containing a biphenyl ring, and it is particularly preferable for the composition to contain a biphenyl compound represented by the following formula (1):

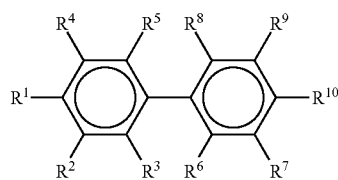

(1)

wherein, in formula (1), $R^1$ to $R^{10}$ are respectively independent of each another; at least one of $R^1$ to $R^{10}$ is a substituent represented by the following formula (2); and the rest of the substituents represents any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

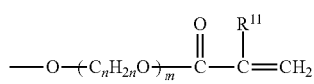

(2)

wherein in formula (2), $R^{11}$ represents a hydrogen atom or a methyl group; the number of carbon atoms n represents an integer from 1 to 4; and the number of repetitions m represents an integer from 1 to 10.

The reason for this is presumed to be that, when a biphenyl compound having a particular structure is incorporated as the component (A), a predetermined difference between the polymerization rates of the component (A) and the component (B) is induced, and the compatibility between the component (A) and the component (B) can be decreased to a predetermined extent, so that copolymerizability between the two components can be decreased.

Furthermore, the refractive index of the region originating from the component (A) can be increased, and the difference thereof with the refractive index of the region originating from the component (B) can be adjusted more easily to a value greater than or equal to a predetermined value.

Furthermore, when $R^1$ to $R^{10}$ in formula (1) includes any one of an alkyl group, an alkoxy group, a halogenated alkyl group, a hydroxyalkyl group and a carboxyalkyl group, it is preferable to adjust the number of carbon atoms of the alkyl moiety to a value in the range of 1 to 4.

The reason for this is that, if the value of such number of carbon atoms exceeds 4, the polymerization rate of the component (A) decreases, or the refractive index of the region originating from the component (A) becomes too low, and it may be difficult to form the predetermined internal structure efficiently.

Therefore, when $R^1$ to $R^{10}$ in formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value in the range of 1 to 3, and even more preferably to a value in the range of 1 to 2.

Furthermore, it is preferable that $R^1$ to $R^{10}$ in formula (1) each represent a substituent other than a halogenated alkyl group or a halogen atom, that is, a substituent that does not contain halogen.

The reason for this is that, when the light diffusion film is disposed of generation of dioxin by incineration is prevented and therefore, it is preferable from the viewpoint of environment protection.

Meanwhile, in conventional light diffusion films, on the occasion of obtaining the desired internal structure, it has been common to perform halogen substitution in the monomer components for the purpose of increasing the refractive indices of the monomer components.

In this regard, when a biphenyl compound represented by formula (1) is used, even if halogen substitution is not performed, a high refractive index can be obtained.

Therefore, if a light diffusion film formed by photocuring the composition for light diffusion film according to the present invention is used, it can exhibit satisfactory incident angle dependency, even without a compound containing halogen.

Furthermore, it is preferable that any one of $R^2$ to $R^9$ in formula (1) be a substituent represented by formula (2).

The reason for this is that, when the position of the substituent represented by formula (2) is set to a position other than the position of $R^1$ and the position of $R^{10}$, the molecules of the component (A) can be effectively prevented from aligning and crystallizing in a stage prior to photocuring.

Furthermore, the compound is liquid at the monomer stage prior to photocuring, and the compound can be apparently uniformly mixed with the component (B) even if a diluent solvent or the like is not used.

It is because, in the photocuring stage, aggregation/phase separation at a fine level of the component (A) and the component (B) is enabled, and a light diffusion film having the predetermined internal structure can be obtained more efficiently.

Furthermore, from the same viewpoint, it is particularly preferable that any one of $R^3$, $R^5$, $R^6$ and $R^8$ in formula (1) be a substituent represented by formula (2).

Furthermore, it is usually preferable that the number of repeating units m in the substituent represented by formula (2) be defined as an integer from 1 to 10.

The reason for this is that, if the number of repeating units m has a value exceeding 10, the oxyalkylene chain that links the polymerization site and the biphenyl ring becomes too long, and polymerization of the molecules of the component (A) at the polymerization site may thereby be inhibited.

Therefore, it is more preferable that the number of repetitions m for the substituent represented by formula (2) be defined as an integer from 1 to 4, and particularly preferable that it be defined as an integer from 1 to 2.

Meanwhile, from the same viewpoint, it is usually preferable that the number of carbon atoms n for the substituent represented by formula (2) be defined as an integer from 1 to 4.

Furthermore, upon considering the case in which the position of a polymerizable carbon-carbon double bond serving as a polymerization site is so close to the biphenyl ring that the biphenyl ring imposes steric hindrance, and the polymerization rate of the component (A) is decreased, it is more preferable that the number of carbon atoms n for the substituent represented by formula (2) be defined as an integer from 2 to 4, and particularly preferable that it be defined as an integer from 2 to 3.

Furthermore, specific preferred examples of the biphenyl compound represented by formula (1) include compounds represented by the following formulas (3) and (4):

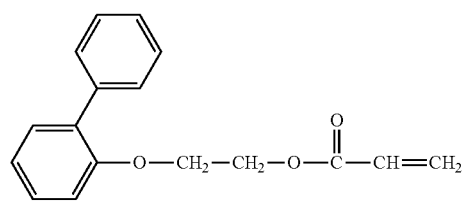

(3)

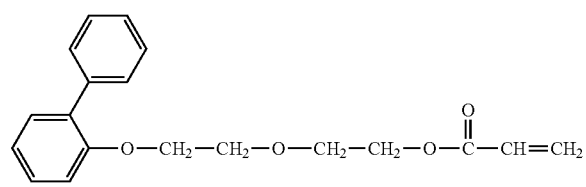

(4)

(ii) Molecular Weight

Furthermore, it is preferable to adjust the molecular weight of the component (A) to a value in the range of 200 to 2,500.

The reason for this is that, by adjusting the molecular weight of the component (A) to a value in a predetermined range, it is presumed that the polymerization rate of the component (A) can be made faster, and copolymerizability of the component (A) and the component (B) can be decreased more effectively.

As a result, when the composition is photocured, in the region with comparatively low refractive index originating from the component (B), a predetermined internal structure can be formed more efficiently, which is composed of a plurality of flaky-shaped objects with comparatively high refractive index originating from the component (A), arranged in multiple rows in a region of comparatively low refractive index along any one arbitrary direction along the film plane.

That is, if the molecular weight of the component (A) has a value of below 200, the polymerization rate is decreased by steric hindrance and approaches the polymerization rate of the component (B), and thus copolymerization with the component (B) may be prone to occur. On the other hand, if the molecular weight of the component (A) has a value exceeding 2,500, it is presumed that the difference between the molecular weight of the component (A) and the molecular weight of the component (B) is decreased, and also, the polymerization rate of the component (A) is decreased to approach the polymerization rate of the component (B), and copolymerization with the component (B) is prone to occur. As a result, it may be difficult to form the predetermined internal structure efficiently.

Therefore, it is more preferable to adjust the molecular weight of the component (A) to a value in the range of 240 to 1,500, and even more preferably to a value in the range of 260 to 1,000.

Meanwhile, the molecular weight of the component (A) can be determined from the calculated value obtainable from the composition of the molecules and the atomic weight of the constituent atoms, or can be measured as the weight average molecular weight using gel permeation chromatography (GPC).

(iii) Single Use

Furthermore, the composition for light diffusion film according to the present invention is characterized by including the component (A) as a monomer component that forms the region with comparatively high refractive in the predetermined internal structure, but it is preferable that the component (A) be included as a single component.

The reason for this is that, when such a configuration is adopted, the fluctuations in the refractive index of the region originating from the component (A), that is, the flaky-shaped objects with comparatively high refractive index, can be suppressed effectively, and thereby a light diffusion film including the predetermined internal structure can be obtained more efficiently.

That is, when the compatibility of the component (A) with the component (B) is low, for example, when the component (A) is a halogen-based compound or the like, another component (A) (for example, a non-halogen-based compound) may be used jointly as a third component for making the component (A) compatible with the component (B).

However, in that case, the refractive index in the region with comparatively high refractive, originating from the component (A), may fluctuate or may become prone to decrease, due to the influence of such a third component.

As a result, the difference in refractive index with the region with comparatively low refractive index, originating from the component (B), may become non-uniform, or may be prone to decrease excessively.

Therefore, it is preferable to select a high refractive index monomer component having compatibility with the component (B), and use that monomer component as a single component (A).

Meanwhile, for example, since a biphenyl compound represented by formula (3) as the component (A) has a low viscosity, the biphenyl compound can be used as a single component (A) in order to have compatibility with the component (B).

(iv) Refractive Index

Furthermore, it is preferable to adjust the refractive index of the component (A) to a value in the range of 1.5 to 1.65.

The reason for this is that when the refractive index of the component (A) is adjusted to a value in such a range, the difference between the refractive index of the region originating from the component (A) and the refractive index of the region originating from the component (B) can be more easily adjusted, and a light diffusion film having a predetermined internal structure can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, if the refractive index of the component (A) has a value exceeding 1.65, the difference between the refractive index of the component (A) and the refractive index of the component (B) becomes large, but it may be difficult to even form an apparent compatibility with the component (B).

Therefore, it is more preferable to adjust the refractive index of the component (A) to a value in the range of 1.52 to 1.62 and even more preferable to a value in the range of 1.56 to 1.6.

Meanwhile, the refractive index of the component (A) means the refractive index of the component (A) prior to photocuring.

Furthermore, the refractive index can be measured according to JIS K0062.

(v) Amount

Furthermore, it is preferable to adjust the amount of component (A) in the composition for light diffusion film to a value in the range of 25 parts to 400 parts by weight relative to 100 parts by weight of the component (B), which is a polymerizable compound with relatively low refractive index that will be described hereinafter.

The reason for this is that, if the amount of component (A) is lower than 25 parts by weight, the ratio of the component (A) relative to the component (B) is decreased, so that the width of the flaky-shaped objects originating from the component (A) becomes excessively small, and it may be difficult to obtain an internal structure having satisfactory incident angle dependency. Furthermore, the length of the flaky-shaped objects in the thickness direction of the light diffusion film becomes insufficient, and light diffusibility may not be exhibited. On the other hand, if the amount of component (A) exceeds 400 parts by weight, the ratio of the component (A) relative to the component (B) is increased, so that the width of the flaky-shaped objects originating from the component (A) becomes excessively large, and it may be difficult to obtain a predetermined internal structure having satisfactory incident angle dependency. Furthermore, the length of the flaky-shaped objects in the thickness direction of the light diffusion film becomes insufficient, and light diffusibility may not be exhibited.

Therefore, it is more preferable to adjust the amount of component (A) to a value in the range of 40 parts to 300 parts by weight, and even more preferably to a value in the range of 50 parts to 200 parts by weight, relative to 100 parts by weight of the component (B).

(1)-2 Low Refractive Index Polymerizable Compound (i) Type of Polymerizable Compound Between the two polymerizable compounds having different refractive indices, the type of the polymerizable compound with comparatively low refractive index (component (B)) is not particularly limited, and examples of main component thereof include urethane (meth)acrylate, a (meth)acrylic polymer having a (meth)acryloyl group in a side chain, a (meth)acryloyl group-containing silicone resin, and an unsaturated polyester resin. However, as main component, it is particularly preferable to use urethane (meth) acrylate.

The reason for this is that, if urethane (meth)acrylate is used, the difference between the refractive index of the region originating from the component (A) and the refractive index of the region originating from the component (B) can be adjusted more easily, the fluctuations in the refractive index of the region originating from the component (B) are effectively suppressed, and thus, a light diffusion film having the predetermined internal structure can be obtained more efficiently.

Therefore, in the following, for the component (B), urethane (meth)acrylate will mainly be described.

Meanwhile, (meth)acrylate means both acrylate and methacrylate.

First, urethane (meth)acrylate is formed from (B1) a compound containing at least two isocyanate groups; (B2) a polyol compound, preferably a diol compound, and particularly preferably polyalkylene glycol; and (B3) hydroxyalkyl (meth)acrylate.

Meanwhile, the component (B) is intended to include an oligomer having a repeating unit of urethane bond.

Among these, examples for the component (B1), the compound containing at least two isocyanate groups, include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds and the like such as ethylene glycol, propylene glycol, neopentyl glycol, trimethylolpropane, and castor oil (for example, xylylene diisocyanate-based trifunctional adduct).

Furthermore, among the compounds described above, it is particularly preferable to have an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the reactions of the component (B1) with only the component (B2), or the component (B1) with only the component (B3) can be inhibited, and the component (B1) can react reliably with the component (B2) and the component (B3), so that generation of excess byproducts can be prevented.

As a result, the fluctuations in the refractive index of the region originating from the component (B), that is, the low refractive region, can be suppressed effectively.

Furthermore, when an alicyclic polyisocyanate is used, compatibility between the component (B) and the component (A) thus obtained can be decreased to a predetermined extent, and a predetermined internal structure can be formed more efficiently, as compared with aromatic polyisocyanates.

Moreover, when an alicyclic polyisocyanate is used, the refractive index of the component (B) thus obtained can be reduced as compared with aromatic polyisocyanates. Therefore, the difference between the refractive index of the component (B) and the refractive index of the component (A) can be increased, so that light diffusibility is exhibited more reliably, and also, the predetermined internal structure having high uniformity of diffused light in the light diffusion angle region can be formed even more efficiently.

Furthermore, among such alicyclic polyisocyanates, an alicyclic diisocyanate containing only two isocyanate groups is preferred.

The reason for this is that when an alicyclic diisocyanate is used, the component (B2) and the component (B3) react quantitatively, and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components forming urethane (meth)acrylate, for the component (B2), examples of polyalkylene glycol include polyethylene glycol, polypropylene glycol, polybutylene glycol, and polyhexylene glycol and the like, and among them, polypropylene glycol is particularly preferred.

The reason for this is that, since polypropylene glycol has low viscosity, this component can be handled solventlessly.

Furthermore, with polypropylene glycol, when the component (B) is cured, the polypropylene glycol forms a satisfactory soft segment in the cured product, and handling ability or decorativeness of the light diffusion film can be enhanced effectively.

Meanwhile, the weight average molecular weight of the component (B) can be adjusted mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components forming urethane (meth)acrylate, for the component (B3), examples of hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate and the like.

Furthermore, from the viewpoint of decreasing the polymerization rate of the urethane (meth)acrylate thus obtainable, and more efficiently forming the predetermined internal structure, the component is more preferably hydroxyalkyl methacrylate, and even more preferably 2-hydroxyethyl methacrylate.

Furthermore, synthesis of the urethane (meth)acrylate based on the components (B1) to (B3) can be carried out by a conventional method.

In this case, it is preferable to adjust the mixing ratio of the components (B1) to (B3) to a mole ratio of component (B1):component (B2):component (B3)=1 to 5:1:1 to 5.

The reason for this is that, with such a mixing ratio, a urethane (meth)acrylate can be efficiently synthesized, in which each one of the isocyanate groups carried by the components (B1) has reacted with the two hydroxyl groups carried by the component (B2) and bonded thereto, and the hydroxyl groups carried by the component (B3) have reacted with the other isocyanate group respectively carried by the two components (B1) and bonded thereto.

Therefore, it is more preferable to adjust the mixing ratio of the components (B1) to (B3) to a molar ratio of component (B1):component (B2):component (B3)=1 to 3:1:1 to 3, and even more preferably to the ratio of 2:1:2.

(ii) Weight Average Molecular Weight

Furthermore, it is preferable to adjust the weight average molecular weight of the component (B) to a value in the range of 3,000 to 20,000.

The reason for this is that, by adjusting the weight average molecular weight of the component (B) to a predetermined range, a predetermined difference is caused between the polymerization rates of the component (A) and the component (B), and thus copolymerizability of the two components can be effectively decreased.

As a result, when the composition is photocured, in the region with comparatively low refractive index originating from the component (B), a predetermined internal structure can be formed efficiently, which is composed of a plurality of flaky-shaped objects with comparatively high refractive index originating from the component (A), arranged in multiple rows in a region of comparatively low refractive index along any one arbitrary direction along the film plane.

That is, if the weight average molecular weight of the component (B) has a value of below 3,000, the polymerization rate of the component (B) is increased and gets closer to the polymerization rate of the component (A), so that copolymerization with the component (A) is likely to occur, and as a result, it may be difficult to form the predetermined internal structure efficiently. On the other hand, if the weight average molecular weight of the component (B) exceeds 20,000, in the region with comparatively low refractive index originating from the component (B), it may be difficult to form the predetermined internal structure, which is composed of a plurality of flaky-shaped objects with comparatively high refractive index originating from the component (A) and arranged in multiple rows along any one arbitrary direction along the film plane, the compatibility with the component (A) may be decreased excessively, and the component (A) may precipitate at the stage of application.

Therefore, it is more preferable to adjust the weight average molecular weight of the component (B) to a value in the range of 5,000 to 15,000, and even more preferable to adjust it to a value in the range of 7,000 to 13,000.

Meanwhile, the weight average molecular weight of the component (B) can be measured using gel permeation chromatography (GPC).

(iii) Single Use

Furthermore, regarding the component (B), two or more types of compounds having different molecular structures or different weight average molecular weights may be used in combination, but from the viewpoint of suppressing fluctuations in the refractive index of the region originating from the component (B), it is preferable to use only one type of compound.

That is, it is because when a plurality of compounds are used for the component (B), the refractive index for the region with comparatively low refractive index originating from the component (B) may fluctuate or increase, and the difference of refractive index with the region with comparatively high refractive index originating from the component (A) may become non-uniform or decrease excessively.

(iv) Refractive Index

Furthermore, it is preferable to adjust the refractive index of the component (B) to a value in the range of 1.4 to 1.55.

The reason for this is that, by adjusting the refractive index of the component (B) to a value in such a range, the difference between the refractive indices of the region originating from the component (A) and the region originating from the component (B) can be easily adjusted, and a light diffusion film having a predetermined internal structure can be obtained more efficiently.

That is, if the refractive index of the component (B) has a value of below 1.4, the difference between the refractive indices of the component (B) and the component (A) is increased, but the compatibility with the component (A) deteriorates to an extreme degree, and there is concern about not being able to form the predetermined internal structure. On the other hand, if the refractive index of the component (B) exceeds 1.55, the difference between the refractive indices of the component (B) and the component (A)

becomes too small, and it may be difficult to obtain the desired incident angle dependency.

Therefore, it is more preferable to adjust the refractive index of the component (B) to a value in the range of 1.45 to 1.54, and even more preferably to a value in the range of 1.46 to 1.52.

Meanwhile, the refractive index of the component (B) described above means the refractive index of the component (B) prior to photocuring.

The refractive index can be measured, for example, according to JIS K0062.

Furthermore, it is preferable to adjust the difference between the refractive indices of the component (A) and the component (B) to a value of 0.01 or more.

The reason for this is that, when such difference in refractive index is adjusted to a value in a predetermined range, a light diffusion film can be obtained, which has more satisfactory incident angle dependency in connection with the transmission and the diffusion of light, and has a broader light diffusion incident angle region.

That is, if such difference in refractive index has a value of below 0.01, because the range of angles at which the incident light undergoes total reflection in the predetermined internal structure narrows, the angle of aperture in the light diffusion may become excessively narrow. On the other hand, if such difference in refractive index becomes excessively large, the compatibility between the component (A) and the component (B) deteriorates too much, and there is concern about not being able to form the predetermined internal structure.

Therefore, it is more preferable to adjust the difference between the refractive indices of the component (A) and the component (B) to a value in the range of 0.05 to 0.5, and even more preferable to adjust it to a value in the range of 0.1 to 0.2.

Meanwhile, the refractive indices of the component (A) and the component (B) mean the refractive indices of the component (A) and the component (B) prior to photocuring.

(v) Amount

Furthermore, it is preferable to adjust the amount of component (B) in the composition for light diffusion film to a value in the range of 10% to 80% by weight relative to 100% by weight of the total amount of the composition for light diffusion film.

The reason for this is that if the amount of component (B) has a value of below 10% by weight, the ratio of the component (B) relative to the component (A) is decreased, so that the region originating from the component (B) becomes excessively small compared to the region originating from the component (A), and it may be difficult to obtain a predetermined internal structure having satisfactory incident angle dependency. On the other hand, if the amount of component (B) exceeds 80% by weight, the ratio of the component (B) relative to the component (A) is increased, so that the region originating from the component (B) becomes excessively large compared to the region originating from the component (A), and it may be difficult to obtain a predetermined internal structure having satisfactory incident angle dependency.

Therefore, it is more preferable to adjust the amount of component (B) to a value in the range of 20% to 70% by weight, and even more preferable to adjust it to a value in the range of 30% to 60% by weight, relative to 100% by weight of the total amount of the composition for light diffusion film.

(1)-3 Photopolymerization Initiator

Furthermore, in the composition for light diffusion film according to the present invention, if desired, it is preferable to incorporate a photopolymerization initiator as a component (C).

The reason for this is, that by incorporating a photopolymerization initiator, when active energy radiation is irradiated to the composition for light diffusion film, the predetermined internal structure can be formed efficiently.

Here, a photopolymerization initiator refers to a compound which generates radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxyl)phenyl 2-(hydroxy-2-propyl) ketone, benzophenone, p-phenylbenzophenone, 4,4-diethylaminobenzophenone, dichlorobenzophenone, 2-methylanthraquinone, 2-ethyl anthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo[2-hydroxy-2-methyl-1-[4-(1-methylvinyl)phenyl]propane. Among these, one type of compound may be used alone, or two or more types of compounds may be used in combination.

Meanwhile, when a photopolymerization initiator is incorporated, it is preferable to adjust the amount of photopolymerization initiator to a value in the range of 0.2 parts to 20 parts by weight, more preferable to adjust it to a value in the range of 0.5 parts to 15 parts by weight, and even more preferable to adjust it to a value in the range of 1 part to 10 parts by weight, relative to 100 parts by weight of the total amount of the component (A) and the component (B).

(1)-4 Other Additives

Furthermore, additives other than the compounds described above can be appropriately added to the extent that the effect of the present invention is not impaired.

Examples of such additives include an oxidation inhibitor, an ultraviolet absorber, an antistatic agent, a polymerization accelerator, a polymerization inhibitor, an infrared absorber, a plasticizer, a diluent solvent, a leveling agent, and the like.

Meanwhile, it is generally preferable to adjust the amount of such additives to a value in the range of 0.01 parts to 5 parts by weight, more preferable to adjust it to a value in the range of 0.02 parts to 3 parts by weight, and even more preferable to adjust it to a value in the range of 0.05 parts to 2 parts by weight, relative to 100 parts by weight of the total amount of the component (A) and the component (B).

(2) Step (b): Application Step

Figure 11A:
FIGS. 11 (a) to (c) are diagrams provided in order to explain the outline of a method for producing a light diffusion film of the present invention.
Figure 11B:
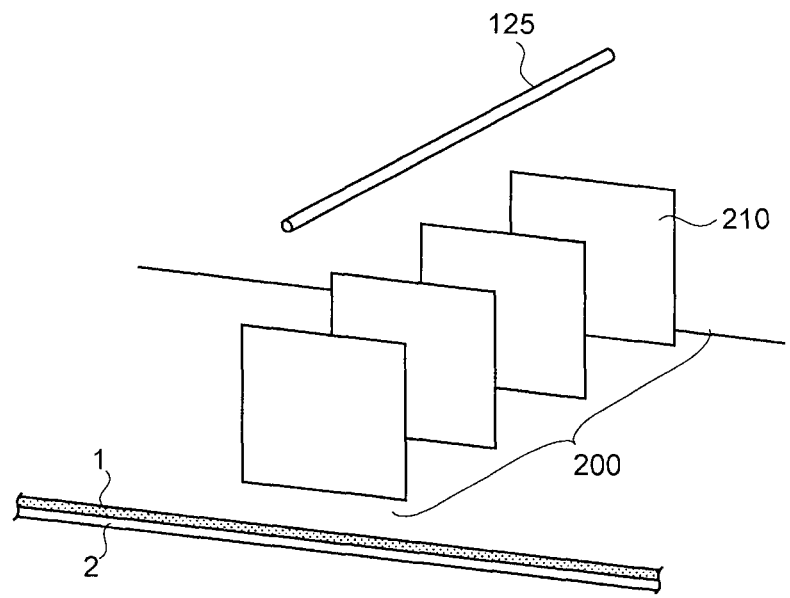
Figure 11C:
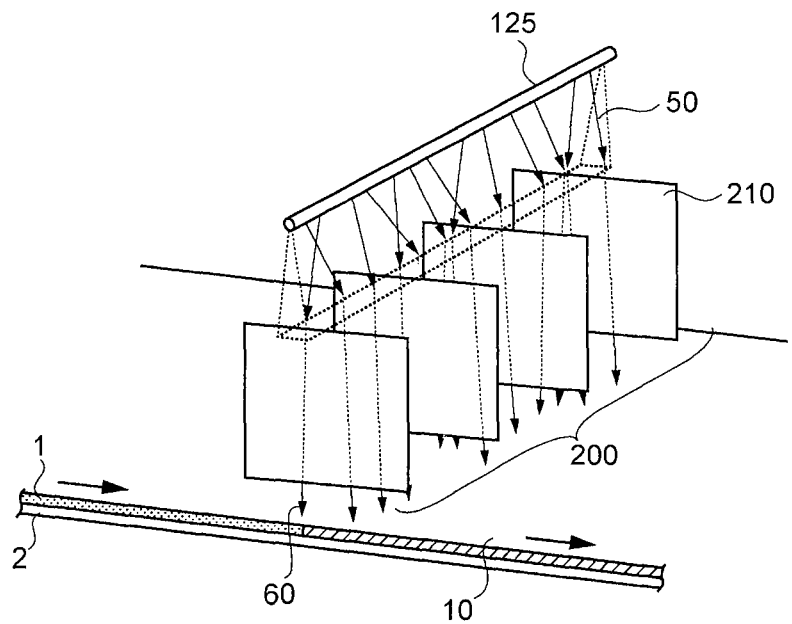

Step (b) is, as illustrated in FIG. 11 (*a*), a step of applying a composition for light diffusion film on a process sheet 2, and forming a coating layer 1.

Regarding the process sheet, a plastic film and paper can all be used.

Among these, examples of plastic films include polyester-based films such as a polyethylene terephthalate film; polyolefin-based films such as a polyethylene film and a polypropylene film, cellulose-based films such as a triacetyl cellulose film, polyimide-based films, and the like.

Furthermore, examples of paper include glassine paper, coated paper, and laminate paper.

Meanwhile, the process sheet is preferably a plastic film, since it has excellent sheet strength and surface smoothness.

Also, upon considering the processes that will be described below, the process sheet 2 is even more preferably a film having excellent dimensional stability against heat or active energy radiation.

Preferred examples of such film include, among those described above, a polyester-based film, a polyolefin-based film, and a polyimide-based film.

Furthermore, in the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, an olefin-based release agent or the like.

Meanwhile, usually, the thickness of the process sheet is preferably adjusted to a value in the range of 25 μm to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, in this case, it is preferable to adjust the thickness of the coating layer to a value in the range of 80 μm to 700 μm.

The reason for this is that, by adjusting the value of the thickness of the coating layer in such a range, the predetermined internal structure can be formed much more efficiently.

That is, if the thickness of the coating layer has a value of below 80 μm, the length of the predetermined internal structure that is formed in the direction of the thickness of the film is insufficient and thereby, the amount of incident light going through the predetermined internal structure is increased and it may become difficult to obtain uniformity of the intensity of the diffused light in the light diffusion angle region. On the other hand, if the thickness of the coating layer has a value exceeding 700 μm, when forming the predetermined internal structure by irradiating an active energy ray to the coating layer, the photopolymerization advancing direction is completely diffused by the predetermined internal structure that has been formed at an early stage, and it may become difficult to form the desired internal structure.

Therefore, it is more preferable to adjust the thickness of the coating layer to a value in the range of 100 to 500 μm, and even more preferable to adjust it to a value in the range of 120 to 300 μm.

(3) Step (c): Active Energy Ray Irradiation Step (3)-1 Active Energy Ray Irradiation Preparation Step Such a step is a step of preparation for transforming an active energy ray coming from an active energy ray light source into an active energy ray having an incident angle width value in each azimuth direction controlled within a predetermined range, prior to the active energy ray irradiation step described hereinafter.

When implementing such a step, as shown in FIG. 11 (b), while using a linear light source 125 as an active energy ray light source and an incident angle width adjustment member 200 for adjusting the incident angle width of the active energy ray coming from the linear light source 125, it is preferable to place the incident angle width adjustment member 200 between the linear light source 125 and the coating layer 1, and in the emission region of the active energy ray coming from the linear light source 125.

More specifically, as shown in FIG. 11 (b), while the incident angle width adjustment member 200 is formed from of a plurality of plate-shaped components 210 and the plurality of plate-shaped components 210 are arranged in parallel with their major surfaces facing each other, it is preferable that these major surfaces be parallel to the vertical direction.

The reason for this is that, by implementing the active energy ray irradiation preparation step in this way, the active energy ray coming from the linear light source is transformed into an active energy ray having a value of incident angle width in each azimuth direction controlled within a predetermined range, and thereby, the coating layer can be subjected to irradiation.

Meanwhile, from the viewpoint of transforming a direct light coming from the linear light source into an active energy ray having a value of incident angle width in each azimuth direction controlled within a predetermined range, it is sufficient for the so-called "plurality of plate-shaped components arranged in parallel with their major surfaces facing each other" to be substantially parallel.

Furthermore, when the active energy ray is irradiated from the linear light source 125 vertically downward as shown in FIG. 11 (c), for example, the position "between the linear light source 125 and the coating layer 1 and in the emission region of an active energy ray coming from the linear light source 125" becomes a position vertically below the linear light source 125 and vertically above the coating layer 1.

Namely, an elliptical-shaped light diffusion film of the present invention is characterized by having a predetermined internal structure inside the film, such as shown in FIGS. 5 (a) and (b) and FIGS. 6 (a) to (c), but, in order to form such a predetermined internal structure, it is preferable to subject the coating layer to the irradiation of the active energy ray having an incident angle width value in each azimuth direction controlled within a predetermined range.

More specifically, as shown in FIGS. 12 (a) to (c), on the surface of the coating layer 1, at any one arbitrary point R situated on a region where the illuminance of the active energy ray 60 coming from an active energy ray light source 125 becomes maximum, the azimuth direction X for which the incident angle width of the active energy ray takes a minimum value θ3 is orthogonal to the azimuth direction Y for which the incident angle width of the active energy ray takes a maximum value θ4. In addition, it is preferable to adjust the minimum value of the incident angle width, θ3, of the active energy ray to 10° or less, and to adjust the maximum value of the incident angle width, θ4, of the active energy ray in the range of 10° (not included) to 40°.

Here, FIG. 12 (a) is a plan view as viewed from above the coating layer 1, FIG. 12 (b) is a side view as viewed from the Y direction in FIG. 12 (a) and is a diagram that shows the incident angle width of the active energy ray in the azimuth direction X.

Furthermore, FIG. 12 (c) is a side view as viewed from the X direction in FIG. 12 (a) and is a diagram that shows the incident angle width of the active energy ray in the azimuth direction Y.

First, when the linear light source 125 is used as an active energy ray source as shown in FIGS. 12 (a) to (c), "on the surface of the coating layer, the region where the illuminance of the active energy ray coming from an active energy ray light source becomes maximum" becomes the central line of the distribution of the active energy ray 60 that is irradiated in a substantial linear way to the surface of the coating layer 1.

Therefore, as shown in FIG. 12 (b), if the active energy ray 60 is irradiated vertically downward from the linear light source 125, the projection line in the vertically downward direction of the central line of the linear light source 125 on the surface of the coating layer 1 of FIG. 12 (a) becomes the region where the illuminance of the active energy ray coming from the active energy ray light source is maximum.

Furthermore, for example, when the active energy ray is irradiated obliquely downward to the right from the linear light source, the vicinity of the projection line obliquely downward to the right of the central line of the linear light source on coating layer surface becomes the region where the illuminance of the active energy ray coming from the active energy ray light source is maximum.

Next, when the linear light source 125 is used as an active energy ray source as shown in FIGS. 12 (a) to (c), "on the surface of the coating layer, at any one arbitrary point situated on a region where the illuminance of the active energy ray coming from an active energy ray light source becomes maximum, an azimuth direction for which the incident angle width of the active energy ray takes a minimum value" becomes the azimuth direction X for which the incident angle width of the active energy ray 60 takes the minimum value θ3, as shown in FIG. 12 (b), and becomes the direction orthogonal to the axial direction of the linear light source 125.

Then, the minimum value of the incident angle width, θ3, of the active energy ray 60 at a point R being "any one arbitrary point", becomes the angle made, from the point R, by the two tangents to the cross-sectional circle of the linear light source 125, as illustrated in FIG. 12 (b).

Moreover, when the linear light source 125 is used as an active energy ray source as shown in FIGS. 12 (a) to (c), "on the surface of the coating layer, at any one arbitrary point situated on a region where the illuminance of the active energy ray coming from an active energy ray light source becomes maximum, the azimuth direction for which the incident angle width of the active energy ray takes a maximum value" becomes the azimuth direction Y for which the incident angle width of the active energy ray 60 takes the maximum value θ4, as shown in FIG. 12 (c), and becomes the direction that is orthogonal to above-mentioned azimuth direction X.

Then, the maximum value of the incident angle width, θ4, of the active energy ray 60 at a point R being "any one arbitrary point", becomes the angle made, from the point R, by the two tangents to the edges of the linear light source 125 side in two neighboring plate-shaped components 210, as illustrated in FIG. 12 (c).

In this way, by having the azimuth direction X, for which the incident angle width of the active energy ray takes a minimum value θ3, orthogonal to the azimuth direction Y, for which the incident angle width of the active energy ray takes a maximum value θ4, the predetermined internal structure can be efficiently formed.

Here above, the case for which a linear light source is used as an active energy ray was explained specifically, but the active energy ray light source that is used is not limited to a linear light source.

In that case, under active energy ray radiation conditions, an illuminance photometer is installed above a process sheet which has not been provided with a coating layer, and, while the process sheet is being moved, the region where the illuminance of the active energy ray coming from the active energy ray light source becomes maximum can also be easily identified by plotting the illuminance and quantity of light.

Furthermore, on the surface of the coating layer, at any one arbitrary point situated on a region where the illuminance of the active energy ray coming from the active energy ray light source becomes maximum, the maximum and minimum values of the incident angle width of the active energy ray can be respectively identified as the maximum and minimum values of the incident angle width of the active energy ray that is not blocked by the plate-shaped components of the incident angle width adjustment member and that is irradiated to that any arbitrary point.

Meanwhile, the identification method described above can also be applied when a linear light source is used as an active energy ray light source.

Furthermore, if the minimum value of the incident angle width, θ3, of the active energy ray as shown in FIG. 12 (b) exceeds 10°, the incident angle width becomes large in both the azimuth directions X and Y, and, as in the case of irradiating with a scattered light, light diffusion characteristics may not be exhibited at all. On the other hand, if the minimum value of the incident angle width, θ3, of the active energy ray becomes excessively small, the cumulative amount of light of the active energy ray becomes low, and the productivity may decrease to an extreme degree.

Therefore, on the surface of the coating layer, at any one arbitrary point of the surface of the coating layer situated on the region where the illuminance of the active energy ray coming from an active energy ray light source becomes maximum, it is more preferable to adjust the minimum value of the incident angle width, θ3, of the active energy ray in the range of 0.1 to 7° and even more preferable to adjust it in the range of 0.5 to 5°.

Furthermore, if the maximum value of the incident angle width, θ4, of the active energy ray as shown in FIG. 12 (c) is less than 10°, the incident angle width becomes small in both of the azimuth directions X and Y, and, as in the case of irradiating with a parallel light, the light diffusion film may become an isotropic light diffusion film which contains a columnar structure inside the film. On the other hand, if the maximum value of the incident angle width, θ4, of the active energy ray exceeds 40°, the difference of incident angle width in the azimuth directions X and Y becomes too large, and, as in the case of irradiating with a direct light from a linear light source, the light diffusion film may become an anisotropic light diffusion film which contains a louver structure inside the film.

Therefore, on the surface of the coating layer, at any one arbitrary point situated on the region where the illuminance of the active energy ray coming from an active energy ray light source becomes maximum, it is more preferable to adjust the maximum value of the incident angle width, θ4, of the active energy ray in the range of 12 to 35° and even more preferable to adjust it in the range of 15 to 30°.

Then, using FIG. 13, the relationship between the maximum value of the incident angle width, θ4, of the active energy ray and the elliptical-shaped light diffusion will be explained.

Figure 13:
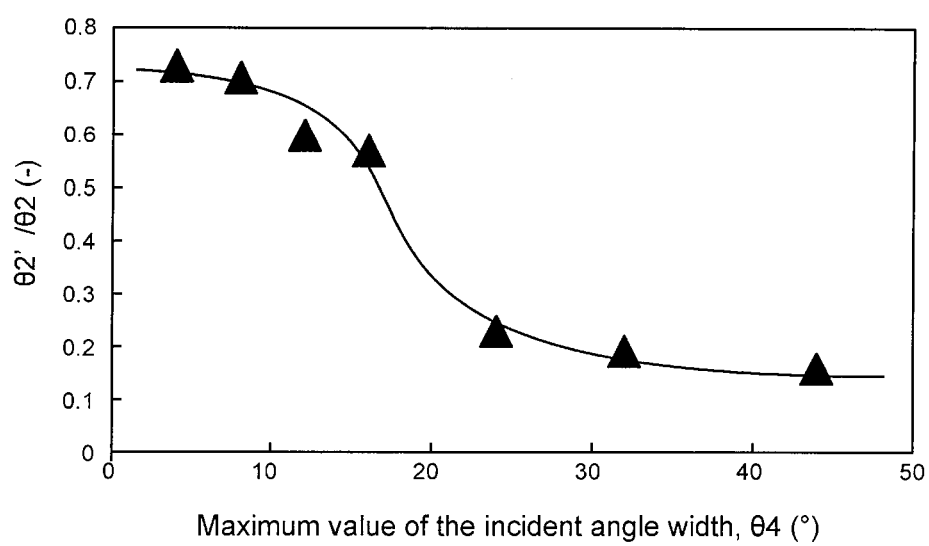
FIG. 13 is a diagram provided in order to explain the relationship between the maximum value of the incident angle width and the elliptical-shaped light diffusion.

Namely, FIG. 13 shows a characteristic curve with the maximum value of the incident angle width, θ4 (°), of the active energy ray in the horizontal axis and θ2'/θ2 (–) in the vertical axis.

Here, as shown in FIGS. 6 (b) and (c), θ2 is the angle of aperture of the diffused light in the major axis direction in the elliptical-shaped light diffusion, and) θ2'(°) is the angle of aperture of the diffused light in the minor axis direction in the elliptical-shaped light diffusion.

As can be understood from such a characteristic curve, if θ4 has a value of 10° or less, the value of θ2'/θ2 becomes excessively large and light diffusion characteristics are exhibited which are close to isotropic light diffusion. On the other hand, if θ4 has a value exceeding 40°, the value of θ2'/θ2 becomes excessively small and light diffusion characteristics are exhibited which are close to anisotropic light diffusion.

Then, when θ4 has a value in the range of 10° (not included) to 40°, elliptical-shaped light diffusion is exhibited, which has intermediary light diffusion characteristics between isotropic light diffusion and anisotropic light diffusion.

Moreover, by having θ4 in the range of 10° (not included) to 40°, because the value of θ2'/θ2 changes together with the change of value of θ4, it is understood that the ellipticity of the elliptical-shaped light diffusion can be controlled effectively by adjusting the value of θ4 when producing the elliptical-shaped light diffusion film.

Figure 14A:
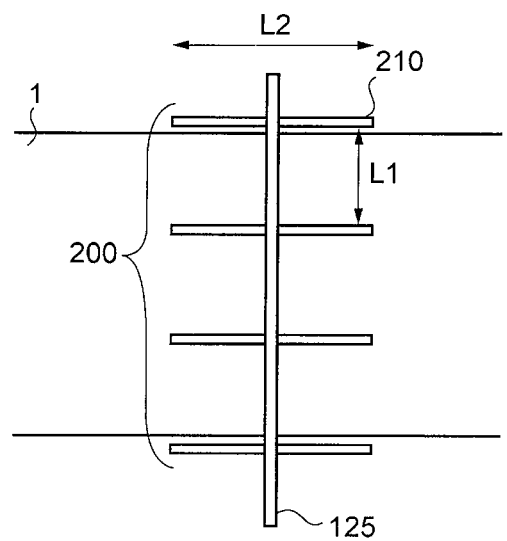
FIGS. 14 (a) and (b) are diagrams provided in order to explain the position of an incident angle width adjustment member.
Figure 14B:
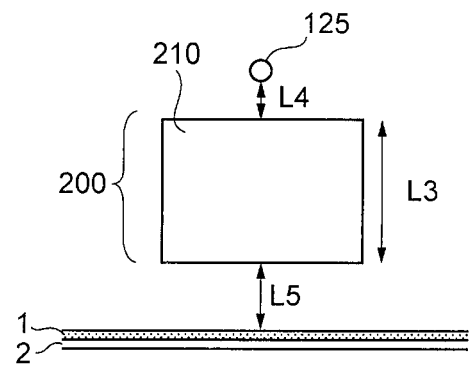

Furthermore, as shown in FIG. 14 (a), the spacing L1 between the plurality of plate-shaped components 210, although depending on the up-to-bottom length L3 and the like of the plate-shaped components 210, is preferably adjusted to a value in the range of 1 to 1000 mm.

The reason for this is that, by adjusting the value of the spacing L1 between the plurality of plate-shaped components 210 in such a range, it is possible to transform more effectively the active energy ray coming from a linear light source into an active energy ray having the incident angle width value in each azimuth direction controlled within a predetermined range.

Namely, if the spacing L1 between the plurality of plate-shaped components has a value of below 1 mm, because the maximum value of the incident angle width, θ4, of the active energy ray becomes 10° or less, the incident angle width becomes small in both the azimuth directions X and Y, and, as in the case of irradiating with a parallel light, the light diffusion film may become an isotropic light diffusion film which contains a columnar structure inside the film. Furthermore, if L1 becomes too small, heat builds up in the plate-shaped member and there is a possibility of having strain occurring in the plate-shaped components. On the other hand, if the spacing L1 between the plurality of plate-shaped components has a value exceeding 1000 mm, because the maximum value of the incident angle width, θ4, of the active energy ray then exceeds 40°, the difference in incident angle width between the azimuth directions X and Y becomes too large, and, as in the case of irradiating with a direct light from a linear light source, the light diffusion film may become an anisotropic light diffusion film which contains a louver structure inside the film.

Therefore, it is more preferable to adjust the value of the spacing L1 between the plurality of plate-shaped components in the range of 5 to 750 mm, and it is even more preferable to adjust it in the range of 10 to 500 mm.

Meanwhile, FIG. 14 (a) shows a simple example for which the number of plate-shaped components is set to four. In reality, the number of plate-shaped components is determined by conditions, such as the width of the coating layer which is the irradiation target of the active energy ray or the spacing L1 between the plurality of plate-shaped components.

Furthermore, the width L2 of the plate-shaped components 210 is not particularly limited, but, usually, is preferably adjusted to a value in the range of 1 to 5000 mm and even more preferably adjusted to a value in the range of 10 to 100 mm.

Meanwhile, usually, the diameter as viewed from the axial direction of the linear light source 125 is preferably adjusted to a value in the range of 5 to 100 mm.

Furthermore, it is preferable to adjust the thickness of the plate-shaped components 210 to a value in the range of 0.1 to 5 mm.

The reason for this is that, by adjusting the value of the thickness of the plate-shaped components in such a range, while suppressing the influence of the shadow caused by the incident angle width adjustment member, strain of the plate-shaped components resulting from the active energy ray can also be suppressed effectively.

Namely, if the thickness of the plate-shaped components has a value of below 0.1 mm, strain resulting from the active energy ray may be prone to occur. On the contrary, if the thickness of the plate-shaped components has a value exceeding 5 mm, the influence of the shadow of the plate-shaped components becomes great, and it may be difficult to suppress the illuminance irregularities in the coating layer.

Therefore, it is more preferable to adjust the thickness of the plate-shaped components to a value in the range of 0.5 to 2 mm, and even more preferable to adjust it to a value in the range of 0.7 to 1.5 mm.

Moreover, if light with low parallelism with respect to the plate-shaped components 210 can be absorbed, the materials composing the plate-shaped components 210 are not particularly limited, and, for example, Ulster steel plates and the like coated with a heat resistant black paint can be used.

Furthermore, it is preferable to arrange the plate-shaped components of the incident angle width adjustment member 200 in a direction that crosses the axial direction of the linear light source.

Moreover, when viewed from above the coating layer, it is more preferable to arrange the plate-shaped components 210 of the incident angle width adjustment member 200 in a direction orthogonal to the axial direction of the linear light source 125.

The reason for this is that, by arranging the incident angle width adjustment member in such a way, even if the spacing L1 between the plurality of the plate-shaped components has the same value, it is possible to reduce the maximum value of the incident angle width, θ4, of the active energy ray.

Namely, if the plate-shaped components are not arranged in a direction orthogonal to the axial direction of the linear light source, compared to when they are orthogonal, even with the same value of L1, the spacing between the plate-shaped components viewed in the axial direction of the linear light source increases.

Namely, if the spacing between the plurality of plate-shaped components increases, because the capacity of collimating the active energy ray is decreased, the value of θ4 increases.

In other words, if the plate-shaped components are not arranged in a direction orthogonal to the axial direction of the linear light source, in order to obtain the same value of θ4 as to when they are orthogonal, the value of L1 has to be decreased.

Then, as L1 is decreased, heat builds up between the plate-shaped components and the like, and gives rise to a harmful effect, that is, easy occurrence of strain in the plate-shaped components.

Furthermore, as shown in FIG. 14 (b), the up-to-bottom length L3 of the plate-shaped components, although depending on the spacing L1 between the plate-shaped components 210, is preferably adjusted to a value in the range of 10 to 1000 mm.

The reason for this is that, by adjusting the value of the up-to-bottom length L3 of the plate-shaped components in such a range, it is possible to transform even more effectively the active energy ray coming from the linear light source into an active energy ray having an incident angle width value in each azimuth direction controlled within a predetermined range.

Namely, if the up-to-bottom length L3 of the plate-shaped components has a value of below 10 mm, because the maximum value of the incident angle width, θ4, of the active energy ray then exceeds 40°, the difference in incident angle width between the azimuth directions X and Y becomes too large, and, as in the case of irradiating with a direct light from a linear light source, the light diffusion film may become an anisotropic light diffusion film which contains a louver structure inside the film. On the other hand, if the up-to-bottom length L3 of the plate-shaped components has a value exceeding 1000 mm, because the maximum value of the incident angle width, θ4, of the active energy ray becomes 10° or less, the incident angle width becomes small in both azimuth directions X and Y, and, as in the case of irradiating with a parallel light, the light diffusion film may become an isotropic light diffusion film which contains a columnar structure inside the film.

Therefore, it is more preferable to adjust the up-to-bottom length L3 of the plate-shaped components to a value in the range of 20 to 750 mm, and it is even more preferable to adjust it to a value in the range of 50 to 500 mm.

Meanwhile, FIG. 14 (*b*) is a side view of the incident angle width adjustment member 200*a* shown in FIG. 14 (*a*), when viewed from the axial direction of the linear light source 125.

Furthermore, it is preferable to adjust the distance L4 between the upper end of the incident light adjustment member 200 and the lower end of the linear light source 125, as shown in FIG. 14 (*b*), to a value in the range of 0.1 to 1000 mm.

The reason for this is that, by adjusting the distance L4 to a value in such a range, while transforming more effectively an active energy ray coming from a linear light source into an active energy ray having an incident angle width value in each azimuth direction controlled within a predetermined range, sufficient amount of active energy ray can be irradiated to the coating layer.

Namely, if such a distance L4 has a value of below 0.1 mm, the incident angle width adjustment member comes too close to the linear light lamp, and, due to heat, the plate-shaped components may develop strain. On the other hand, if such a distance L4 has a value exceeding 1000 nm, the coating layer is then too far from the linear light source and the active energy ray that is incident to the coating layer may become excessively weak.

Therefore, it is more preferable to adjust the distance L4 between the upper end of the incident light adjustment member and the lower end of the linear light source to a value in the range of 0.5 to 500 mm, and even more preferable to adjust it to a value of 1 to 100 mm.

Furthermore, it is preferable to adjust the distance L5 between the lower end of the incident light adjustment member and the surface of the coating layer, as shown in FIG. 14 (*b*), to a value in the range of 0.1 to 1000 mm.

The reason for this is that, by adjusting the distance L5 to a value in such a range, while suppressing more effectively the influence of the shadow caused by the incident angle width adjustment member, it is possible to transform even more effectively the active energy ray coming from the linear light source into an active energy ray having an incident angle width value in each azimuth direction controlled within a predetermined range That is, if such a distance L5 has a value of below 0.1 mm, not only the influence of the shadow caused by the incident angle width adjustment member becomes excessively great, but also the lower end of the incident angle width adjustment member may come into contact with the surface of the coating layer by small vibrations at the time of irradiation.

On the other hand, if such a distance L5 has a value exceeding 1000 nm, the coating layer is then too far from the linear light source and the active energy ray that is incident to the coating layer may become excessively weak.

Therefore, it is more preferable to adjust the distance L5 between the lower end of the incident light adjustment member and the surface of the coating layer to a value in the range of 0.5 to 500 mm, and even more preferable to adjust it to a value of 1 to 100 mm.

Meanwhile, so far, there have been only mentions of an incident angle width adjustment member with plate-shaped components aligned in parallel and of a linear light source as an active energy ray light source, but on the occasion of producing an elliptical-shaped light diffusion film, an important point is to adjust the values of θ3 and θ4 in a specified range.

Therefore, for example, by using an assembly of rectangular tubes for the incident angle width adjustment member and using a plane light source as an active energy ray light source, the specified range of θ3 and θ4 may be also obtained.

Moreover, without using an incident angle width adjustment member, if a parallel light source is used as an active energy ray light source and is diffused by the elliptical-shaped light diffusion elements of the elliptical-shaped light diffusion film, the specified range of θ3 and θ4 may also be obtained.

(3)-2 Active Energy Irradiation Step

As shown in FIG. 11 (*c*), such a step is, usually, a step of irradiating an active energy ray to the coating layer 1, while the coating layer 1 is being moved, and it is a step wherein, as shown in FIGS. 12 (*a*) to (*c*), on the surface of the coating layer 1, at any one arbitrary point R situated on a region where the illuminance of the active energy ray 60 coming from an active energy ray light source 125 becomes maximum, the azimuth direction X for which the incident angle width of the active energy ray takes a minimum value θ3 is orthogonal to the azimuth direction Y for which the incident angle width of the active energy ray takes a maximum value θ4. In addition, it is a step wherein the minimum value of the incident angle width, θ3, of the active energy ray is adjusted to 10° or less, and the maximum value of the incident angle width, θ4, of the active energy ray is adjusted in the range of 10° (not included) to 40°.

Figure 15A:
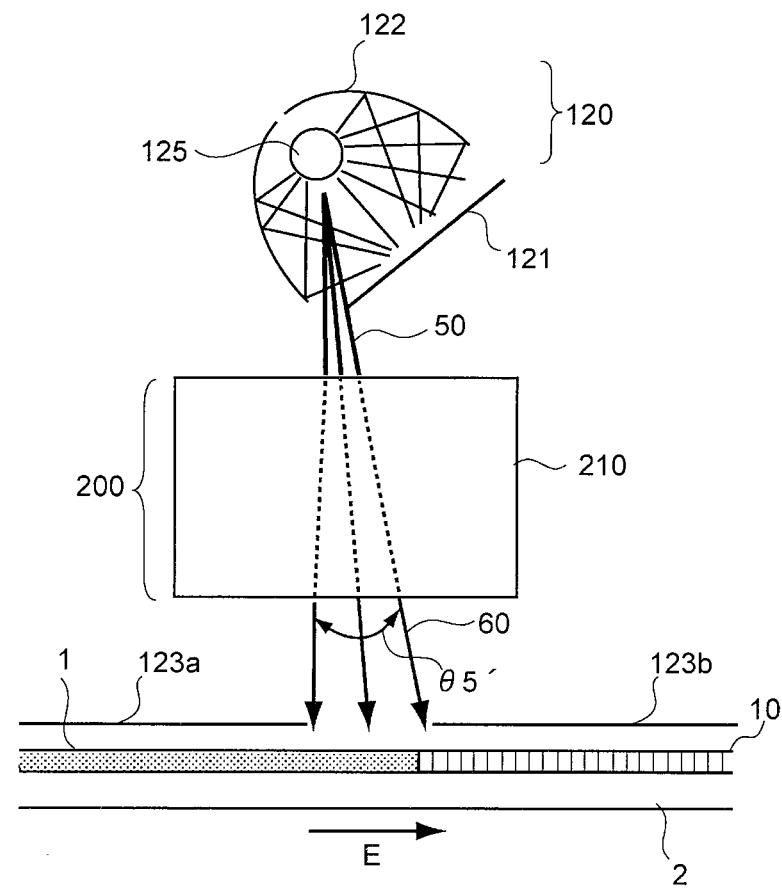
FIGS. 15 (a) and (b) are diagrams provided in order to explain the active energy ray irradiation step.
Figure 15B:
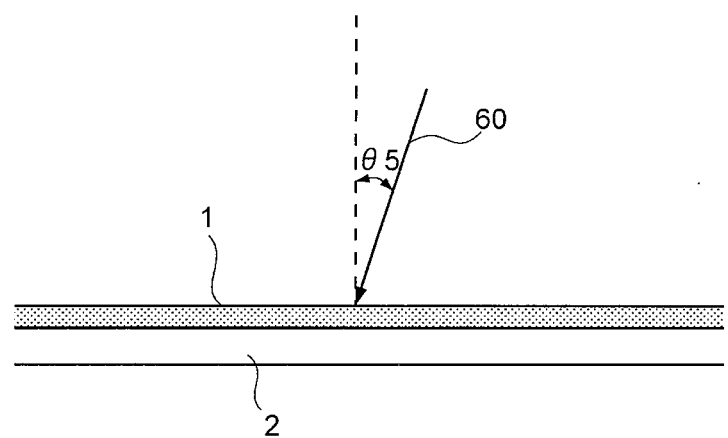

More specifically, for example, as illustrated in FIG. 15 (*a*), with an ultraviolet irradiation apparatus 120 (for example, if a commercially available product is to be used, ECS-4011GX or the like manufactured by Eye Graphics Co., Ltd.) in which a cold mirror 122 for light collection is provided on a linear ultraviolet lamp 125, an active energy radiation 50, through the incident angle width adjustment member 200, is irradiated to the coating layer 1 formed on the process sheet 2.

Furthermore, it is preferable to improve even more the parallelism of the active energy ray 50 by providing light blocking members 123*a, b* between the incident angle width adjustment member 200 and the coating layer 1.

Moreover, from the viewpoint of improving the parallelism of the active energy ray 50, it is preferable to set the active energy ray 50 to only a direct light coming from the linear light source 125 by providing a light blocking plate 121 between the linear light source 125 and the incident angle width adjustment member 200.

Meanwhile, when viewed from above the coating layer 1, the linear ultraviolet lamp 125 is installed, with respect to a direction orthogonal to the moving direction of the coating layer 1 as reference (0°), so as to form usually an angle having a value in the range of −80° to 80°, preferably in the range of −50° to 50°, and particularly preferably in the range of −30° to 30°.

Furthermore, regarding the irradiation angle of the active energy ray, as shown in FIG. 15 (*b*), when the angle of the normal with respect to the surface of the coating layer 1 is set to be 0°, it is usually preferable to adjust the irradiation angle θ5 to a value in the range of −80° to 80°.

The reason for this is that, when the inclination angle has a value that does not fall in the range of −80° to 80°, the influence of the reflection or the like at the surface of the coating layer 1 becomes great, and it may be difficult to form the predetermined internal structure.

Furthermore, the irradiation angle θ5 has preferably a width θ5' (irradiation angle width) in the range of 1° to 80°.

The reason for this is that, if such an irradiation angle width θ5' has a value of below 1°, the coating layer has to be moved at an excessively decreased rate and the producibility may be decreased. On the other hand, if such an irradiation angle width θ5' has a value exceeding 80°, the irradiated light is dispersed too much, and it may be difficult to form the predetermined internal structure.

Therefore, it is more preferable to adjust the irradiation angle width θ5' of the irradiation angle θ5 to a value in the range of 2° to 45°, and even more preferable to adjust it to a value in the range of 5° to 20°.

Meanwhile, if the angle at exactly the intermediate position has an irradiation angle width θ5', it is set to be the irradiation angle θ5.

Furthermore, it is preferable to adjust the peak illuminance for the active energy ray irradiation at the surface of the coating layer to a value in the range of 0.01 mW/cm$^2$ to 50 mW/cm$^2$.

The reason for this is that, by adjusting the peak illuminance for the active energy ray irradiation to a value in such a range, the predetermined internal structure can be formed more stably inside the film.

That is, if such illuminance has a value of below 0.01 mW/cm$^2$, it may be difficult to form definitely the predetermined internal structure. On the other hand, if such peak illuminance has a value exceeding 50 mW/cm$^2$, it is presumed that the curing reaction over-proceeds, and it may be impossible to form definitely the predetermined internal structure.

Therefore, it is more preferable to adjust the peak illuminance for the active energy ray irradiation at the surface of the coating layer to a value in the range of 0.05 mW/cm$^2$ to 40 mW/cm$^2$, and even more preferably to a value in the range of 0.1 mW/cm$^2$ to 30 mW/cm$^2$.

Furthermore, it is preferable to adjust the cumulative amount of light for the active energy ray irradiation at the surface of the coating layer to a value in the range of 1 mJ/cm$^2$ to 1000 mJ/cm$^2$.

The reason for this is that, when the cumulative amount of light for the energy ray irradiation is adjusted to a value in such a range, the predetermined internal structure can be formed more stably inside the film.

That is, if such a cumulative amount of light has a value of below 1 mJ/cm$^2$, it may be difficult to extend the predetermined internal structure sufficiently from the upper section toward the lower section. On the other hand, when such a cumulative amount of light has a value exceeding 1000 mJ/cm$^2$, coloring may occur in the obtained light diffusion film.

Therefore, it is more preferable to adjust the cumulative amount of light at the coating layer surface for the first active energy ray irradiation to a value in the range of 2 mJ/cm$^2$ to 500 mJ/cm$^2$, and even more preferable to adjust it to a value in the range of 5 mJ/cm$^2$ to 200 mJ/cm$^2$.

Furthermore, it is preferable to move the coating layer at a rate in the range of 0.1 m/min to 10 m/min.

The reason for this is that, by moving the coating layer at a rate in such a range, an elliptical-shaped light diffusion film can be produced efficiently.

That is, if the coating layer is moved at a rate below 0.1 m/min, the producibility of the elliptical-shaped light diffusion film may be decreased to an extreme degree. On the other hand, if the coating layer is moved at a rate exceeding 10 m/min, the cumulative amount of light becomes insufficient and thereby, it may be difficult to sufficiently extend the predetermined internal structure from the upper section toward the lower section.

Therefore, it is more preferable to move the coating layer at a rate in the range of 0.2 m/min to 5 m/min, and more preferably at a rate in the range of 0.5 m/min to 3 m/min.

It is also preferable to irradiate an active energy ray while having an active energy ray transmitting sheet laminated on the surface of the coating layer.

The reason for this is that, by laminating an active energy ray transmitting sheet, the influence of oxygen inhibition can be effectively suppressed, and the predetermined internal structure can be formed more efficiently.

That is, when an active energy ray transmitting sheet is laminated on the surface of the coating layer, an active energy radiation can be effectively irradiated to the coating layer by causing the sheet to transmit the radiation, while stably preventing the surface of the coating layer from being brought into contact with oxygen.

Meanwhile, for the active energy ray transmitting sheet, any sheet capable of transmitting active energy radiation among the process sheets described in step (b) (application step) can be used without any particular limitations.

Furthermore, in order to have a cumulative amount of light which sufficiently cure the coating layer, it is also preferable to perform an additional active energy ray irradiation, different from the active energy ray irradiation of the step (c).

Because the objective is to cure sufficiently the coating layer, the active energy ray at this point is not a parallel beam or the like and it is preferable to use a random light (scattering light) with uncontrolled individual vectors.

EXAMPLES

Example 1

1. Synthesis of Component (B)

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the compounds were reacted according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:
GPC analyzer: manufactured by Tosoh Corp., HLC-8020
GPC column: manufactured by Tosoh Corp. (hereinafter, described in order of passage)
TSK GUARD COLUMN HXL-H
TSK GEL GMHXL (×2)
TSK GEL G2000HXL
Measurement solvent: Tetrahydrofuran
Measurement temperature: 40° C.

2. Preparation of a Composition for Light Diffusion Film

Subsequently, after 100 parts by weight of o-phenylphenoxyethoxyethyl acrylate (manufactured by Shin Nakamura Chemical Co., Ltd., NK ESTER A-LEN-10) having a molecular weight of 268 and represented by the following formula (3) as a component (A), and 10 parts by weight of 2-hydroxy-2-methylpropiophenone as a component (C) were added to 100 parts by weight of the polyether urethane methacrylate having a weight average molecular weight of 9,900 as the component (B) thus obtained, the compounds were heated and mixed under the conditions of 80° C. Thus, a composition for light diffusion film was obtained. Meanwhile, the refractive indices of the component (A) and the component (B) were measured using an Abbe refractometer (manufactured by Atago Co., Ltd., product name: "ABBE REFRACTOMETER DR-M2", Na light source, wavelength: 589 nm), according to JIS K0062, and the refractive indices were 1.58 and 1.46, respectively.

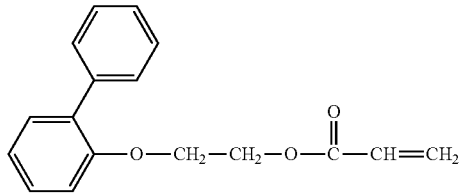

(3)

3. Application of the Composition for Light Diffusion Film

Next, the composition for light diffusion film thus obtained was applied on a transparent polyethylene terephthalate film (hereinafter, referred to as PET) as a process sheet, and thus a coating layer having a film thickness of 200 μm was obtained.

4. Positioning of the Incident Angle Width Adjustment Member

Subsequently, a linear ultraviolet lamp was prepared, which comprises an ultraviolet irradiation apparatus (manufactured by Eye Graphics Co., Ltd., ECS-4011GX) in which a cold mirror for light concentration is attached to a linear high pressure mercury lamp as shown in FIG. 15 (a) (diameter: 25 mm, length: 0.4 m, power capacity: 4.5 kW).

Then, an incident angle width adjustment member, which is formed by arranging a plurality of plate-shaped components parallel to each other, was placed between the linear ultraviolet lamp and the coating layer, as shown in FIG. 11 (b).

At this point, the incident angle width adjustment member was arranged so that, when viewed from above the coating layer, the moving direction of the coating layer and the extension direction of the plate-shaped components made an acute angle of 0°.

Furthermore, the spacing between the plurality of plate-shaped components in the incident angle width adjustment member (L1 in FIG. 14 (a)) was 20 mm, the width of the plate-shaped components (L2 in FIG. 14 (a)) was 150 mm, the thickness of the plate-shaped components was 1 mm, and their material was an Ulster steel coated with a heat resistant black paint.

Moreover, the up-to-bottom length of the incident angle width adjustment member (L3 in FIG. 14 (b)) was 70 mm, the distance between the top part of the incident angle width adjustment member and the low part of the linear ultraviolet lamp (L4 in FIG. 14 (b)) was 250 mm, and the distance between the low part of the incident angle width adjustment member and the surface of the coating layer (L5 in FIG. 14 (b)) was 180 mm.

Furthermore, the linear ultraviolet lamp was arranged so that the moving direction of the coating layer was orthogonal to the long axis direction of the linear ultraviolet lamp, and so that the active energy ray (ultraviolet light) is irradiated vertically downward from the ultraviolet lamp.

Therefore, the projection line in the vertically downward direction of the central line of the ultraviolet lamp on the surface of the coating layer becomes the region where the illuminance of the active energy ray (ultraviolet light) coming from the ultraviolet lamp is maximum.

5. Ultraviolet Irradiation

Subsequently, when irradiating ultraviolet light from the linear ultraviolet lamp through the incident angle width adjustment member, the ultraviolet light was irradiated to the coating layer over the peeling film so that, at any one arbitrary point situated on the region where the illuminance of the above-mentioned ultraviolet light becomes maximum on the surface of the coating layer, when viewed from the axial direction of the linear ultraviolet lamp, the incident angle width of the ultraviolet light took a minimum value (θ3 of FIG. 12 (b)) of 1.4°, and, when viewed from the moving direction of the coating layer, orthogonal to the axial direction of the linear ultraviolet lamp, the incident angle width of the ultraviolet light took a maximum value (θ4 of FIG. 12 (c)) of 16°.

As a result, a light diffusion film with a thickness of 193 μm was obtained.

The peak illuminance of the peeling film surface on this occasion was adjusted to 2.46 mW/cm2, the cumulative amount of light was adjusted to 23.49 mJ/cm2, the lamp height was adjusted to 500 mm, and the coating layer was moved at a rate of 0.6 m/minute.

Meanwhile, the film thickness of the light diffusion film was measured using a constant pressure thickness measuring instrument (manufactured by Takara Co., Ltd., TECLOCK PG-02J).

Furthermore, it was confirmed that the light diffusion film thus obtained contained, inside the film, a predetermined internal structure composed of a plurality of flaky-shaped objects with comparatively high refractive index, arranged in multiple rows in a region with comparatively low refractive index along any one arbitrary direction along the film plane, and that the angle of inclination of the flaky-shaped objects was 0°.

Figure 16A:
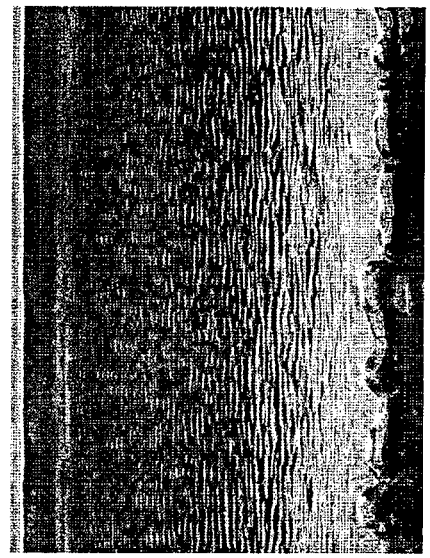
FIGS. 16 (a) to (c) are photographs provided in order to explain the aspects of cross-sections in the light diffusion film of Example 1.
Figure 16B:
Figure 16C:
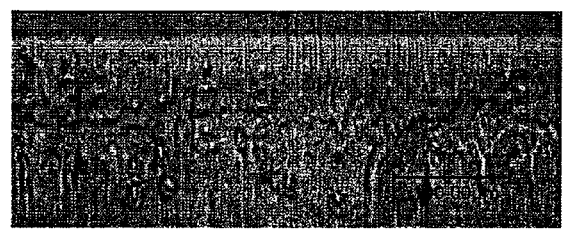

Furthermore, cross-sectional photographs of the light diffusion film thus obtained are shown in FIGS. 16 (a) to (c).

Figure 17:
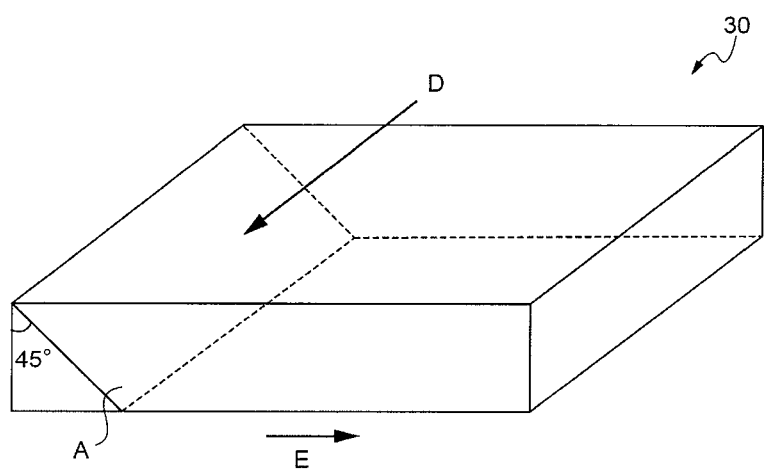
FIG. 17 is a diagram provided in order to explain a cutting mode of the film.

That is, FIG. 16 (a) is a photograph of the cross-section that was taken from the front in a case for which the film is cut, as shown in FIG. 17, along a plane A having an inclination of 45° with respect to the film plane, in other words, in the direction of the arrow D; FIG. 16 (b) is a cross-sectional photograph in a case for which the film is cut along a plane perpendicular to the film plane and parallel to the moving direction of the coating layer; and FIG. 16 (c) is a cross-sectional photograph in a case for which the film is cut along a plane perpendicular to the cut surface of FIG. 16 (b).

At this point, the width $T_{50}$ of the flaky-shaped objects at a position of 50 Jim below the upper end of the flaky-shaped objects in the direction of the thickness of the light diffusion film had a value of 1.3 µm, and the length $L_{50}$ of the flaky-shaped objects in the arrangement direction along the film plane at the same position had a value of 9.3 µm.

Therefore, $T_{50}/L_{50}$ was equal to 0.13.

Furthermore, the distance $P_{50}$ between the plurality of flaky-shaped objects in the arrangement direction along the film plane of the flaky-shaped objects at the same position was equal to 6.6 µm, and the distance $P_{50}'$ between the rows of flaky-shaped objects that were arranged in multiple rows at the same position was equal to 1.1 µm.

Furthermore, because $T_{75}$ had a value of 1.2 µm and $L_{75}$ had a value of 19 µm, $T_{75}/L_{75}$ was equal to 0.063, $P_{75}$ was equal to 10 µm, and $P_{75}'$ was equal to 2.1 µm Moreover, because $T_{100}$ had a value of 1.5 µm and $L_{100}$ had a value of 31 µm, $T_{100}/L_{100}$ was equal to 0.048, $P_{100}$ was equal to 8.4 µm, and $P_{100}'$ was equal to 2.5 µm 6. Evaluation (1) Light-Receiving Angle-Relative Luminance Charts for the Diffused Light The light-receiving angle-relative luminance charts were measured for the light diffusion film thus obtained.

That is, an incident light with θ1 in FIG. 6 (b) set to 0° was sent to the light diffusion film thus obtained.

Next, using a multiangle colorimeter (Suga Test Instruments, Co. (Ltd.), VC-2), the light-receiving angle-relative luminance charts for the diffused light were obtained in the direction parallel to the moving direction of the coating layer and in the direction perpendicular to that direction.

Figure 18A:
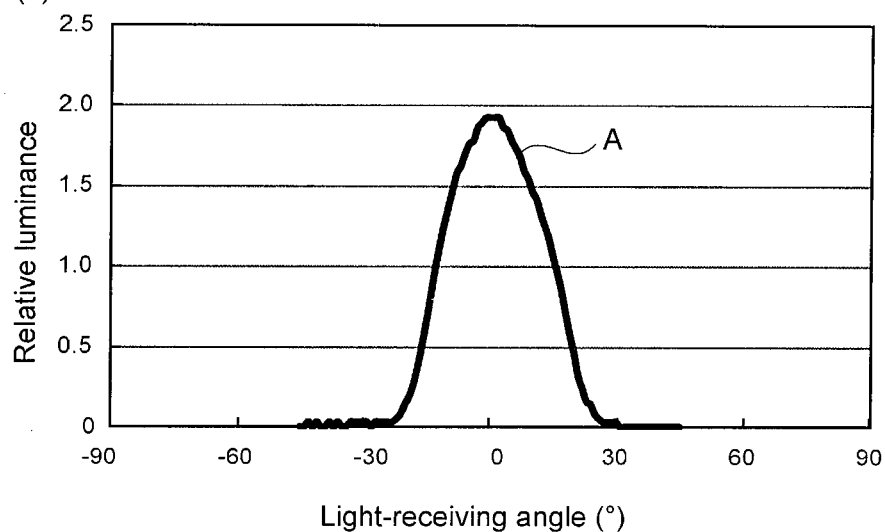
FIGS. 18 (a) and (b) are light-receiving angle-relative luminance charts illustrating the light diffusion characteristics in the light diffusion film of Example 1.
Figure 18B:
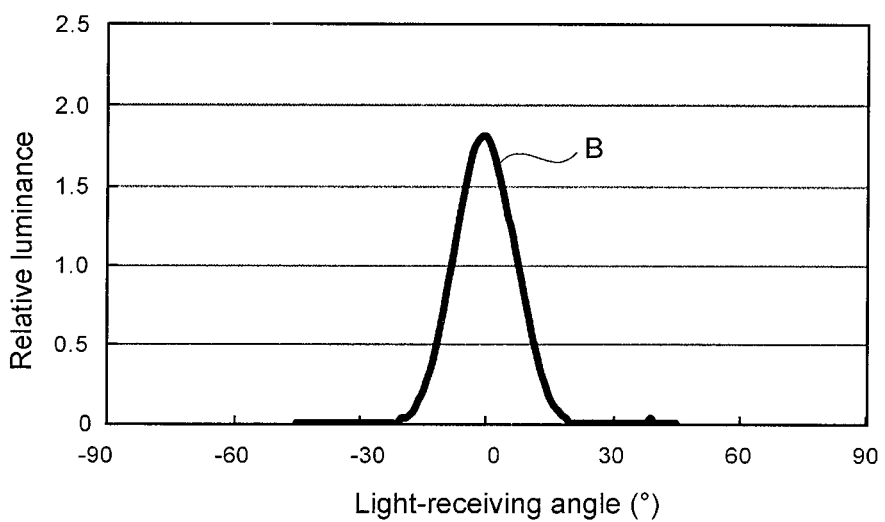

Namely, as shown in FIGS. 18 (a) and (b), the light-receiving angle-relative luminance charts were obtained in the case where the light diffusion angle (°) of the light diffused by the light diffusion film is plotted on the horizontal axis, and the relative luminance (–) of the diffused light is plotted on the vertical axis.

Here, the light-receiving angle-relative luminance chart A of FIG. 18 (a) corresponds to the diffused light in the direction parallel to the moving direction of the coating layer, and the light-receiving angle-relative luminance chart B of FIG. 18 (b) corresponds to the diffused light in the direction orthogonal to that direction.

Furthermore, θ2 (the angle of aperture of the diffused light in the major axis direction in the elliptical-shaped light diffusion film) based on the full width at half maximum of the light-receiving angle-relative luminance chart A had a value of 28°, θ2' (the angle of aperture of the diffused light in the minor axis direction in the elliptical-shaped light diffusion film) based on the full width at half maximum of the light-receiving angle-relative luminance chart B had a value of 16°, so that the ratio θ2'/θ2 was equal to 0.57.

(2) Photographs of the Diffused Light

Photographs of the light diffusion in the light diffusion film thus obtained were taken.

Figure 19A:
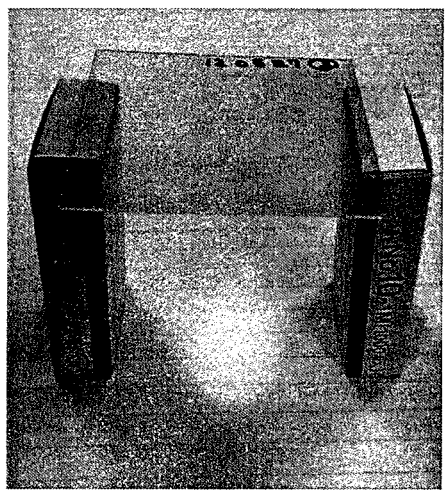
FIGS. 19 (a) and (b) are, respectively, a photograph and a diagram to explain the light diffusion characteristics in the light diffusion film of Example 1.
Figure 19B:
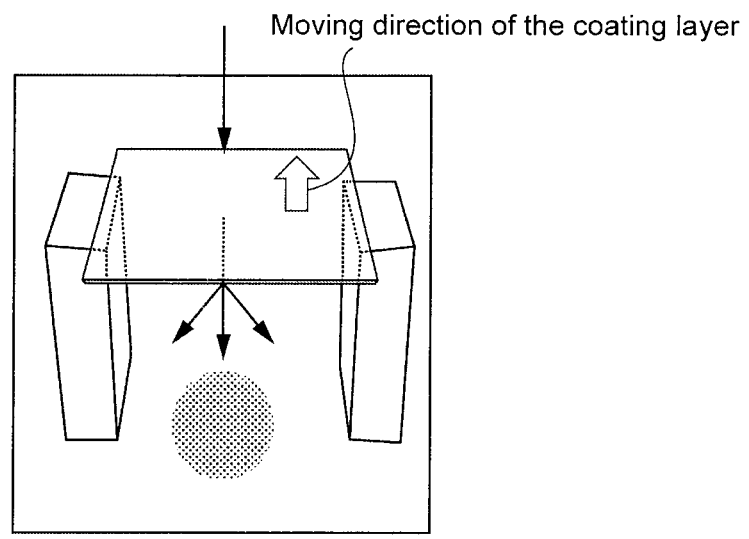

Namely, an incident light with θ1 in FIG. 6 (b) set to 0° was sent to the light diffusion film thus obtained and was diffused, and a photograph of the light diffusion was taken. The photograph thus obtained is shown in FIG. 19 (a), and the diagram drawn from such a photograph is shown in FIG. 19 (b).

From such a photograph or diagram, it was confirmed that the diffusion state of the diffused light had an elliptical shape, with the major axis (D1) within a plane parallel to the film being 12.5 mm, the minor axis (DS) being 7.0 mm, and the ratio DS/D1 thus being 0.56.

Furthermore, the diffusion state of the light that was confirmed from such a photograph or diagram was consistent with the light diffusion characteristics shown in the measured light-receiving angle-relative luminance charts.

Comparative Example 1

In Comparative Example 1, the ultraviolet light coming from the linear ultraviolet lamp was irradiated, without using the incident light adjustment member.

Under these conditions, the ultraviolet light was irradiated to the coating layer over the peeling film so that, at any one arbitrary point situated on the region where the illuminance of the above-mentioned ultraviolet light becomes maximum on the surface of the coating layer, when viewed from the axial direction of the linear ultraviolet lamp, the incident angle width of the ultraviolet light took a minimum value (θ3 of FIG. 12 (b)) of 1.4°, and, when viewed from the moving direction of the coating layer, orthogonal to the axial direction of the linear ultraviolet lamp, the incident angle width of the ultraviolet light took a maximum value (θ4 of FIG. 12 (c)) of 44°.

Furthermore, the peak illuminance of the peeling film surface on this occasion was adjusted to 7.42 mW/cm$^2$, the cumulative amount of light was adjusted to 21 mJ/cm$^2$, the coating layer was moved at a rate of 2 m/minute, and other conditions except from these were the same as in Example 1.

Moreover, it was confirmed that the light diffusion film thus obtained contained a louver structure in which a plurality of plate-shaped regions with different refractive indices were alternately arranged inside the film along any one arbitrary direction along the film plane, and that the angle of inclination of the plate-shaped regions was 0°.

Furthermore, cross-sectional photographs of the light diffusion film thus obtained are shown in FIGS. 20 (a) to (c).

Namely, FIG. 20 (a) is a cross-sectional photograph in a case for which the film is cut, as shown in FIG. 17, along a plane having an inclination of 45° with respect to the film plane; FIG. 20 (b) is a cross-sectional photograph in a case for which the film is cut along a plane perpendicular to the film plane and parallel to the moving direction of the coating layer; and FIG. 20 (c) is a cross-sectional photograph in a case for which the film is cut along a plane perpendicular to the cut surface of FIG. 20 (b).

At this point, the width $T_{50}$ at a position of 50 µm below the upper end of the plate-shaped regions in the direction of the thickness of the light diffusion film had a value of 1.5 µm, and the length $L_{50}$ of the plate-shaped regions in the arrangement direction along the film plane at the same position had a value of 46 µm.

Therefore, $T_{50}/L_{50}$ was equal to 0.032.

Furthermore, FIGS. 21 (a) and (b) show the light-receiving angle-relative luminance charts for the light diffusion film thus obtained.

Here, the light-receiving angle-relative luminance chart A of FIG. 21 (a) corresponds to the diffused light in the direction parallel to the moving direction of the coating layer, and the light-receiving angle-relative luminance chart B of FIG. 21 (b) corresponds to the diffused light in the direction orthogonal to that direction.

Furthermore, θ2 based on the full width at half maximum of the light-receiving angle-relative luminance chart A had a value of 25°, θ2' based on the full width at half maximum of the light-receiving angle-relative luminance chart B had a value of 4°, so that the ratio θ2'/θ2 was equal to 0.16.

Figure 22A:
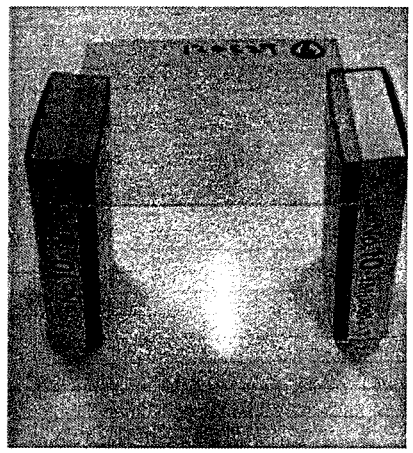
FIGS. 22 (a) and (b) are, respectively, a photograph and a diagram provided to explain the light diffusion characteristics in the light diffusion film of Comparative Example 1.
Figure 22B:
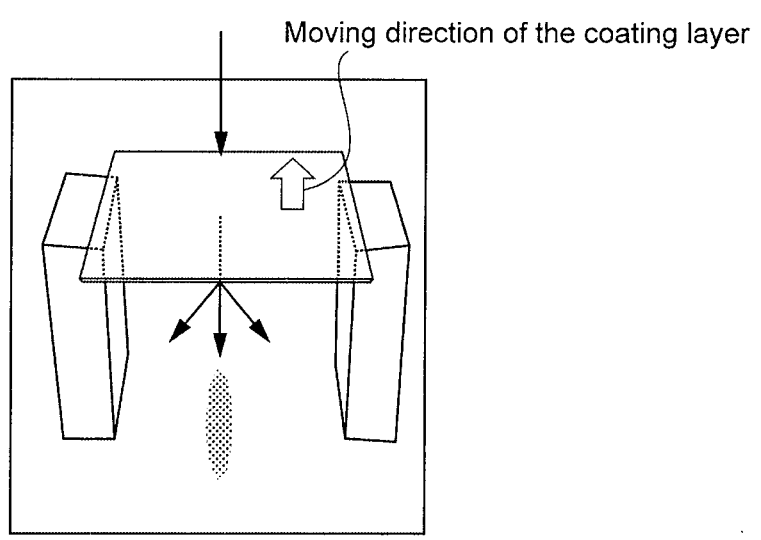

Namely, FIG. 22 (a) shows a photograph showing the diffusion state of the light diffused by the light diffusion film thus obtained, and the diagram drawn from such a photograph is shown in FIG. 22 (b).

From such a photograph or diagram, since the diffusion state of the diffused light had a rod-like shape, with the major axis (D1) within a plane parallel to the film being 11.1 mm, the minor axis (DS) being 1.7 mm, and the ratio DS/D1 thus being 0.16, it was confirmed that light diffusion was anisotropic.

Furthermore, the diffusion state of the light that was confirmed from such a photograph or diagram was consistent with the light diffusion characteristics shown in the measured light-receiving angle-relative luminance charts.

Comparative Example 2

In Comparative Example 2, instead of the incident angle width adjustment member, two light blocking plates for transmitting only ultraviolet light coming from a portion in the axial direction of the linear ultraviolet lamp were arranged, with a predetermined spacing, parallel to the coating layer, in the vicinity of and vertically below the ultraviolet lamp, and ultraviolet light coming from the linear ultraviolet lamp was adjusted so that to become a nearly parallel light, then was irradiated.

Under these conditions, the ultraviolet light was irradiated to the coating layer over the peeling film so that, at any one arbitrary point of the surface of the coating layer, when viewed from the axial direction of the linear ultraviolet lamp, the incident angle width of the ultraviolet light took a minimum value (θ3 of FIG. 12 (b)) of 1.4°, and, when viewed from the moving direction of the coating layer, orthogonal to the axial direction of the linear ultraviolet lamp, the incident angle width of the ultraviolet light took a maximum value (θ4 of FIG. 12 (c)) of 2.2°.

Furthermore, the peak illuminance of the peeling film surface on this occasion was adjusted to 0.36 mW/cm$^2$, the cumulative amount of light was adjusted to 43.99 mJ/cm$^2$, the coating layer was moved at a rate of 0.05 m/minute, and except from these, the conditions were the same as in Example 1.

Moreover, it was confirmed that the light diffusion film thus obtained contained a columnar structure composed of a plurality of pillars with comparatively high refractive index standing close together inside the film in regions with comparatively low refractive index, and that the angle of inclination of the pillars was 0°.

Figure 23A:
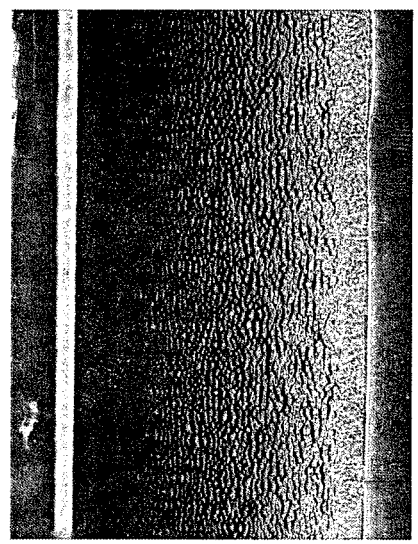
FIGS. 23 (a) to (c) are diagrams provided in order to explain the aspects of cross-sections in the light diffusion film of Comparative Example 2.
Figure 23B:
Figure 23C:

Furthermore, cross-sectional photographs of the light diffusion film thus obtained are shown in FIGS. 23 (a) to (c).

Namely, FIG. 23 (a) is a cross-sectional photograph in a case for which the film is cut, as shown in FIG. 17, along a plane having an inclination of 45° with respect to the film plane; FIG. 23 (b) is a cross-sectional photograph in a case for which the film is cut along a plane perpendicular to the film plane and parallel to the moving direction of the coating layer; and FIG. 23 (c) is a cross-sectional photograph in a case for which the film is cut along a plane perpendicular to the cut surface of FIG. 23 (b).

At this point, the width $T_{50}$ (=$L_{50}$) at a position of 50 μm below the upper end of the pillars in the direction of the thickness of the light diffusion film had a value of 2.3 μm.

Therefore, $T_{50}/L_{50}$ was equal to 1.

Figure 24A:
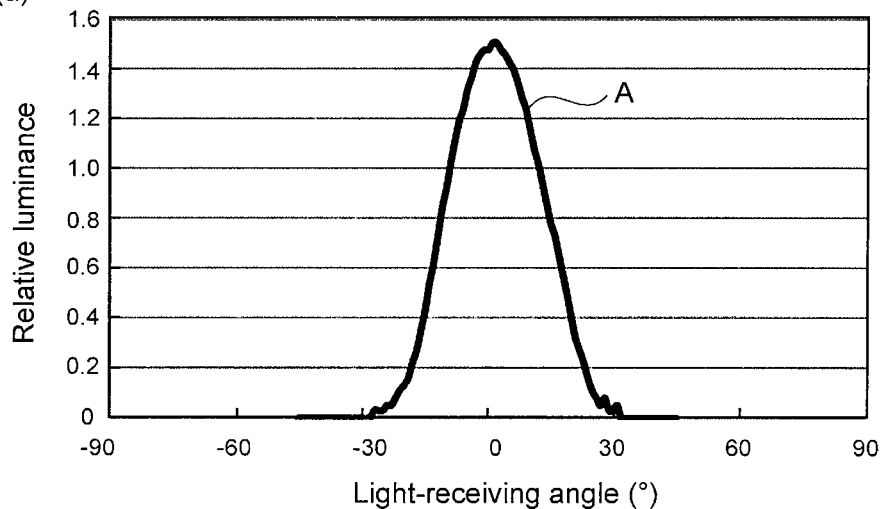
FIGS. 24 (a) and (b) are light-receiving angle-relative luminance charts to explain the light diffusion characteristics in the light diffusion film of Comparative Example 2.
Figure 24B:
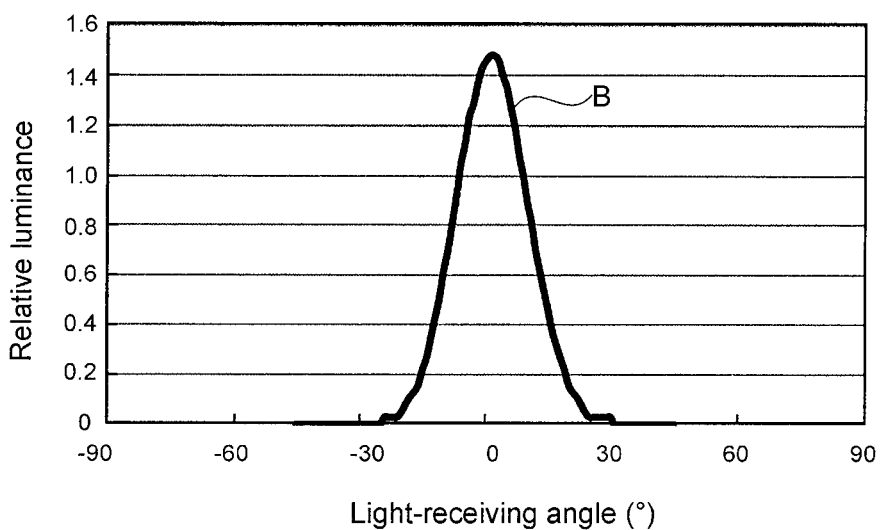

Furthermore, FIGS. 24 (a) and (b) show the light-receiving angle-relative luminance charts for the light diffusion film thus obtained.

Here, the light-receiving angle-relative luminance chart A of FIG. 24 (a) corresponds to the diffused light in the direction parallel to the moving direction of the coating layer, and the light-receiving angle-relative luminance chart B of FIG. 24 (b) corresponds to the diffused light in the direction orthogonal to that direction.

Furthermore, θ2 based on the full width at half maximum of the light-receiving angle-relative luminance chart A had a value of 26°, θ2' based on the full width at half maximum of the light-receiving angle-relative luminance chart B had a value of 25°, so that the ratio θ2'/θ2 was equal to 0.96.

Figure 25A:
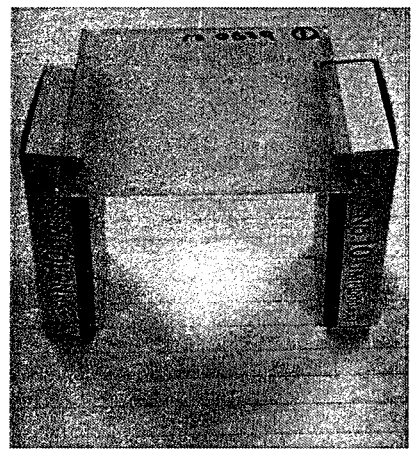
FIGS. 25 (a) and (b) are, respectively, a photograph and diagram to explain the light diffusion characteristics in the light diffusion film of Comparative Example 2.
Figure 25B:
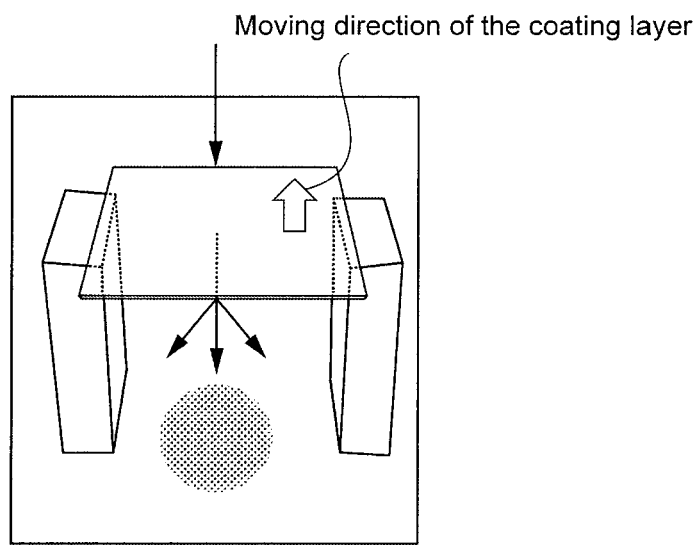

Namely, FIG. 25 (a) shows a photograph showing the diffusion state of the light diffused by the light diffusion film thus obtained, and the diagram drawn from such a photograph is shown in FIG. 25 (b).

From such a photograph or diagram, it was confirmed that light diffusion was isotropic.

From such a photograph or diagram, since the diffusion state of the light had a circular shape, with the major axis (D1) within a plane parallel to the film being 11.5 mm, the minor axis (DS) being 11.1 mm, and the ratio DS/D1 thus being 0.96, it was confirmed that light diffusion was isotropic.

Furthermore, the diffusion state of the light that was confirmed from such a photograph or diagram was consistent with the light diffusion characteristics shown in the measured light-receiving angle-relative luminance charts.

INDUSTRIAL APPLICABILITY

As described above, according to the present invention, by forming a predetermined internal structure region in the film, it has become possible to diffuse incident light into an elliptical shape with respect to a plane parallel to the light diffusion film.

As a result, it has become possible to provide a light diffusion film which has excellent applicability to rectangular displays.

Therefore, it is expected that the light diffusion film of the present invention would contribute markedly to an enhancement of product quality of light diffusion films that are used, in addition to light control films for reflective liquid crystal devices, in viewing angle control films, viewing angle expansion films, as well as screens for projection and the like.

EXPLANATIONS OF LETTERS OR NUMERALS

1: coating layer
2: process sheet
10: anisotropic light diffusion film
12: plate-shaped region with comparatively high refractive index
13: louver structure 14: plate-shaped region with comparatively low refractive index
20: isotropic light diffusion film
22: pillars with comparatively low refractive index
23: columnar structure
24: region with comparatively low refractive index
30: elliptical-shaped light diffusion film
32: flaky-shaped object with comparatively high refractive index
33: predetermined internal structure
34: region with comparatively low refractive index
50: active energy ray coming from an active energy ray light source
60: active energy ray having the incident angle width value in each azimuth direction controlled within a predetermined range
121: light blocking plate
122: cold mirror for light collection
123: light blocking member
125: linear light source
200: incident angle width adjustment member
210: plate-shaped component

The invention claimed is:

1. A light diffusion film for diffusing incident light into an elliptical shape, the film comprising:
a plurality of flaky-shaped objects with comparatively high refractive index arranged in a region with comparatively low refractive index,
said flaky-shaped objects having an elongate structure defined by a width (T), a length (L), and a height, where the height extends from an upper terminus to a lower terminus, the lower terminus of each object being proximate to a lower planar surface of the film, and the upper terminus of each object terminating generally in the same plane, where $T_{50}$ is the width and $L_{50}$ is the length of a cross-section of each object at a plane 50 μm below the plane where the upper terminus of each object generally terminates, where the length (L) of said plurality of flaky-shaped objects increases along the height of said objects from a minimum length proximate to said upper terminus to a maximum length proximate to said lower terminus, and
where $T_{50}$ and $L_{50}$ satisfy the following relationship:

$$0.05 \leq T_{50}/L_{50} < 0.9 \qquad (1).$$

2. The light diffusion film according to claim 1, wherein said plurality of flaky-shaped objects are arranged in multiple rows.

3. The light diffusion film according to claim 1, where $T_{50}$ is in the range of 0.1 to 15 μm and $L_{50}$ is in the range of 0.11 to 300 μm.

4. The light diffusion film according to claim 1, where $T_{75}$ is the width and $L_{75}$ is the length of a cross-section of each object at a plane 75 μm below the plane where the upper terminus of each object generally terminates, and
where $T_{75}$ and $L_{75}$ satisfy the following relationship:

$$0.01 \leq T_{75}/L_{75} < 0.5 \qquad (2).$$

5. The light diffusion film according to claim 4, where $T_{75}$ is in the range of 0.1 to 15 μm and $L_{75}$ is in the range of 0.2 to 1500 μm.

6. The light diffusion film according to claim 1, where $T_{100}$ is the width and $L_{100}$ is the length of a cross-section of each object at a plane 100 μm below the plane where the upper terminus of each object generally terminates, and
where $T_{100}$ and $L_{100}$ satisfy the following relationship:

$$0.005 \leq T_{100}/L_{100} \leq 0.1 \qquad (3).$$

7. The light diffusion film according to claim 6, where $T_{100}$ is in the range of 0.1 to 15 μm and $L_{100}$ is in the range of 1 to 3000 μm.

8. The light diffusion film according to claim 1, wherein, as raw material for the light diffusion film, a composition for light diffusion film contains two polymerizable compounds with different refractive indices.

9. The light diffusion film according to claim 1, wherein, when the incident light is diffused by the light diffusion film, in the elliptical-shaped light diffusion thus obtained, if θ2 is the angle of aperture of the diffused light in the major axis direction, and if θ2' is the angle of aperture of the diffused light in the minor axis direction, the following relation (4) is satisfied:

$$0.2 \leq \theta 2'/\theta 2 \leq 0.9 \qquad (4).$$

* * * * *